US011648990B2

(12) United States Patent
Barnicle et al.

(10) Patent No.: US 11,648,990 B2
(45) Date of Patent: May 16, 2023

(54) CONFIGURABLE COMMON DECK SYSTEM

(71) Applicant: MSI Defense Solutions, LLC, Mooresville, NC (US)

(72) Inventors: Linden Barnicle, Troutman, NC (US); David Nelson, Salisbury, NC (US); Raymond Poynor, Mooresville, NC (US); Ed Sans, Mt. Ulla, NC (US)

(73) Assignee: MSI Defense Solutions, LLC, Mooresville, NC (US)

( * ) Notice: Subject to any disclaimer, the term of this patent is extended or adjusted under 35 U.S.C. 154(b) by 670 days.

(21) Appl. No.: 16/782,990

(22) Filed: Feb. 5, 2020

(65) Prior Publication Data

US 2020/0247481 A1    Aug. 6, 2020

Related U.S. Application Data

(60) Provisional application No. 62/844,095, filed on May 6, 2019, provisional application No. 62/801,213, filed on Feb. 5, 2019.

(51) Int. Cl.
*B62D 33/00* (2006.01)
*B62D 33/02* (2006.01)

(52) U.S. Cl.
CPC ............................. *B62D 33/0207* (2013.01)

(58) Field of Classification Search
CPC ............... B62D 21/09; B62D 25/2009; B62D 25/2027; B62D 27/023; B62D 25/20; B62D 33/077; B62D 33/02; B62D 33/0207; B62D 25/2054; B62D 27/06; B60P 1/4485; B60P 1/4492

USPC ......... 296/26.01–26.13, 35.3, 100.02–100.5, 296/204, 193.07, 184.1
See application file for complete search history.

(56) References Cited

U.S. PATENT DOCUMENTS

| | | | | |
|---|---|---|---|---|
| 2,052,914 A | * | 9/1936 | Williams | B60P 3/075 410/105 |
| 3,212,457 A | * | 10/1965 | Looker | B60P 7/0815 410/105 |
| 4,226,465 A | * | 10/1980 | McCullough | B62D 21/12 410/104 |
| 4,230,432 A | | 10/1980 | Howell | |
| 4,900,058 A | * | 2/1990 | Hobrecht | F16B 7/18 296/102 |
| 6,918,721 B2 | * | 7/2005 | Venton-Walters | B60P 7/0807 410/102 |
| 7,029,215 B2 | * | 4/2006 | Dowty | B61D 33/00 410/104 |
| 7,147,417 B2 | * | 12/2006 | Priesgen | B60P 1/435 410/104 |

(Continued)

OTHER PUBLICATIONS

International Search Report and Written Opinion dated Apr. 22, 2020 for corresponding International Application No. PCT/US2020/016871.

*Primary Examiner* — Stephen T Gordon
(74) *Attorney, Agent, or Firm* — Jeffrey C. Watson; Grell & Watson Patent Attorneys LLC

(57) ABSTRACT

A configurable common deck system includes a support frame, and a plurality of decking planks. The support frame is configured to attach to the original equipment ("OE") chassis of a vehicle. The plurality of decking planks is configured to cover the support frame to create a deck. Wherein, the deck has a customizable size with a length, a width and a height.

20 Claims, 17 Drawing Sheets

(56) References Cited

U.S. PATENT DOCUMENTS

| | | | |
|---|---|---|---|
| 7,506,855 B2* | 3/2009 | Frantz | B64C 1/20 |
| | | | 410/90 |
| 2004/0258498 A1 | 12/2004 | Bruns | |
| 2006/0088397 A1* | 4/2006 | Dorris | B60P 7/02 |
| | | | 411/82 |
| 2007/0222259 A1 | 9/2007 | Oliver | |
| 2007/0296248 A1* | 12/2007 | Kuriakose | B62D 33/02 |
| | | | 296/187.01 |
| 2011/0260486 A1 | 10/2011 | Thygesen | |
| 2014/0064895 A1 | 3/2014 | Michaud | |
| 2018/0043810 A1 | 2/2018 | Adams et al. | |
| 2018/0281575 A1 | 10/2018 | Singer | |
| 2018/0334195 A1 | 11/2018 | Stojkovic et al. | |

* cited by examiner

CONFIGURABLE COMMON DECK SYSTEM

CROSS-REFERENCE TO RELATED APPLICATIONS

This application claims benefit of priority application, U.S. Provisional Ser. No. 62/844,095 filed on May 6, 2019, entitled "Configurable Common Deck System with Flush Mounted Integration Plate", and U.S. Provisional Ser. No. 62/801,213 filed on Feb. 5, 2019, entitled "Configurable Common Deck System", which are incorporated herein by reference in their entirety.

FIELD OF THE DISCLOSURE

The present disclosure is related to vehicles and accessories to such vehicles. More specifically, the present disclosure is directed to a configurable common deck system for vehicles, like for any vehicle that has a main cargo platform that is a separate removable entity that is not attached to the passenger compartment body structure. In select embodiments, the disclosed configurable common deck system includes a flush mounted integration plate or multiple flush mounted integration plates.

BACKGROUND

Original Equipment ("OE") cargo platforms, or cargo boxes, are commonly found on pickup trucks from manufactures such as Toyota, Honda, Ford, Chevrolet, GMC, RAM, Isuzu, Mazda, Nissan, or any brand where the main cargo platform is a separate removable entity that is not attached to the passenger compartment body structure.

However, these OE cargo platforms do not allow for customization of the cargo platform or deck, like customized lengths, widths and height dimensions that may be customized in a modular format per customer specifications.

Also, these OE cargo platforms do not allow for interchangeability of the cargo platforms between other OE vehicle platforms, like between multiple OE occupant compartments (or "cab") configurations (such as single, 2-door, extended, 4-door, and crew cab variants).

In addition, these OE cargo platforms do not provide minimal, if any, anchoring solutions.

Furthermore, these OE cargo platforms do not provide the ability to accept and mount designed modules, kits and sub-systems.

Finally, these OE cargo platforms do not provide the ability to be reconfigured to achieve specific mission profile set(s) by allowing for installation and removal of mounted modules, kits, or subsystems without having to replace the main deck and extension deck modules.

Therefore, a need exists for a device, system or method for OE cargo platforms that allows for customization of the cargo platform or deck, allows for interchangeability of the cargo platforms between other OE vehicle platforms, provides anchoring solutions, provides the ability to accept and mount designed modules, kits and sub-systems, provides the ability to be reconfigured to achieve specific mission profile set(s), the like, and/or combinations thereof.

The instant disclosure may be designed to address at least certain aspects of the problems or needs discussed above by providing a configurable common deck system.

SUMMARY

The present disclosure solves the aforementioned limitations of the currently available OE cargo platforms, by providing a configurable common deck system. The disclose device, system or method may be configured for various OE cargo platforms to allow for customization of the cargo platform or deck, to allow for interchangeability of the cargo platforms between other OE vehicle platforms, to provide anchoring solutions, to provide the ability to accept and mount designed modules, kits and sub-systems, to provide the ability to be reconfigured to achieve specific mission profile set(s), the like, and/or combinations thereof. The disclosed configurable common deck system for an original equipment chassis of a vehicle may generally include a support frame and a plurality of decking planks. The support frame may be configured to be attached to the original equipment chassis of the vehicle. The plurality of decking planks may be configured to cover the support frame to create a deck. Wherein, the deck may have a customizable size with a length, a width and a height.

One feature of the disclosed configurable common deck system may be that it can include a plurality of anchor tracks. The anchor tracks may be recessed between the decking planks or on top of the decking planks. The plurality of anchor tracks may be configured for attaching modules, kits and sub-systems at various desired locations on the deck. In select embodiments, each of the plurality of anchor tracks may be seat and cargo track fittings configured for a single stud fitting, a double stud fitting and a triple stud fitting. In select embodiments thereof, each of the plurality of anchor tracks can include a single stud load capacity rating from 4,000 to 6,000 pounds for the single stud fitting, or a double or triple stud load capacity rating up to 10,000 pounds for the double stud fitting or the triple stud fitting. Wherein, the plurality of anchor tracks may be configured for panel fittings, stanchion fittings, galley fittings, tiedown fittings, or a combination thereof.

Another feature of the disclosed configurable common deck system may be the inclusion of at least one attachment ring in select embodiments. The attachment rings may be configured for lifting the deck, securing cargo on the deck, or combinations thereof. In select embodiments, the configurable common deck system may include four attachment rings positioned approximate each corner of the deck.

In select embodiments of the disclosed configurable common deck system, the support frame may include a pair of longitudinal beams, a plurality of cross-beams, a plurality of supports, and a rigid outer deck frame. The pair of longitudinal beams may run the length of the deck. The pair of longitudinal beams may include attachment locations configured for attaching the deck to the original equipment chassis. The plurality of cross-beams may interconnect the pair of longitudinal beams. The plurality of supports may run the width of the deck configured for supporting the plurality of decking planks and the plurality of anchor tracks. In select embodiments, each of the attachment locations on the pair of longitudinal beams may include a cantilever mount. The cantilever mounts may each include a tension bracket having a hook and at least one attachment hole. The attachment hole may be configured for securing the longitudinal beams directly to the original equipment chassis via bolts or the like.

Another feature of the disclosed configurable common deck system may be the inclusion of a cargo or equipment cover assembly in select embodiments. The cargo or equipment cover may be configured for covering the deck in a closed position and being configured to open to a rear of the deck in an open position for exposing the deck. In select embodiments, the cargo or equipment cover assembly may include a pair of slide tracks approximate outer longitudinal edges of the deck. The slide tracks may be configured to allow the cargo or equipment cover assembly to slide from the closed position to the open position. Wherein the pair of slide tracks approximate the outer longitudinal edges of the deck may be attached to the deck via anchor track on or approximate the outer longitudinal edges of the deck.

Another feature of the disclosed configurable common deck system may be the inclusion of a bulkhead rollbar assembly in select embodiments. Wherein the bulkhead rollbar assembly may be configured to attach and support equipment, weaponry, or combinations thereof near a cab of the vehicle.

Another feature of the disclosed configurable common deck system may be the inclusion of a module extension assembly in select embodiments. The module extension assembly may be configured to provide an added length to the deck for mounting on a longer original equipment chassis or for providing an extended deck length on the original equipment chassis. Wherein, when the module extension assembly is attached to the deck, the deck may be configured to be used on the longer original equipment chassis or on the same OE chassis for providing an extended length of the deck. In addition, when the module extension assembly is not attached to the deck, the same deck may be configured to be used on a shorter original equipment chassis. In select embodiments, the module extension assembly may include an extension frame, a plurality of extended decking planks, and a pair of connection rods. The extension frame may be configured to attach to the original equipment chassis of the vehicle. The plurality of extended decking planks may be configured to cover the extension frame to create an extension deck. The pair of connection rods may be configured to connect the support frame of the deck to the extension frame of the extension deck. The pair of connection rods may be configured for locating, connecting and stiffening the connection between the module extension assembly and the deck.

Another feature of the disclosed configurable common deck system may be the inclusion of an integration plate in select embodiments. In select embodiments, the integration plate may be flush mounted to the decking planks and anchor tracks, wherein a top side of the integration plate is flush with a top surface of the deck. The integration plate may be configurable for an array of hardware locations and sizes via fully tapped holes. In select embodiments, each of the fully tapped holes may be reinforced with steel threaded inserts. the fully tapped holes may be located and sized to match a thread size and a pitch that a customer chooses. Accordingly, the integration plate with the fully tapped holes may be configured to mount weaponry, wherein a bolt pattern of weaponry is configured to match the fully tapped holes of the integration plate. The configurable common deck with the integration plate may provide a flat and clean surface that a customer can use to carry standard cargo, a palletized item or, palletized items, whereby the configurable common deck with the integration plate is configured to then switch to mount a particular item that gives the customer offensive or defensive capabilities. In select embodiments, the integration plate or plates may include a circular integration plate with circularly oriented fully tapped holes. In other select embodiments, the integration plate or plates may include a rectangular integration plate with rectangularly oriented fully tapped holes. In other select embodiments, the integration plate may include both circular integration plate with circularly oriented fully tapped holes and rectangular integration plate with rectangularly oriented fully tapped holes.

In another aspect, the instant disclosure may be directed toward the configurable common deck system in any of the various embodiments and/or combination of embodiments shown and/or described herein.

In another aspect, the instant disclosure embraces a method for the customization of an original equipment cargo platform of a vehicle. The disclosed method for the customization of an original equipment cargo platform of a vehicle may include utilizing the configurable common deck system disclosed herein in any of the various embodiments and/or combination of embodiments shown and/or described herein. As such, in general the disclosed method for the customization of an original equipment cargo platform of a vehicle may include providing the configurable common deck system for an original equipment chassis of the vehicle as disclosed herein in any of the various embodiments and/or combination of embodiments shown and/or described herein. Accordingly, the provided configurable common deck system may generally include a support frame and a plurality of decking planks. The support frame may be configured to attach to the original equipment chassis of the vehicle. The plurality of decking planks may be configured to cover the support frame to create a deck. Wherein, the deck may have a customizable size with a length, a width and a height. As a result, with the provided configurable common deck system, the method for the customization of an original equipment cargo platform of a vehicle may also include the steps of: installing the provided configurable common deck system on the original equipment chassis of the vehicle; and customizing the original equipment cargo platform of the vehicle via the installed configurable common deck system.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-31, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Referring now to FIGS. 1-30, in a possibly preferred embodiment, the present disclosure overcomes the above-mentioned disadvantages and meets the recognized need for such an apparatus, system or method by providing of the disclosed configurable common deck system 10. The present disclosure of configurable common deck system 10 solves the aforementioned limitations of the currently available devices, systems or methods for OE cargo platforms by providing the disclosed common deck system 10 that may allow for customization of the cargo platform or deck, allows for interchangeability of the cargo platforms between other OE vehicle platforms, provides anchoring solutions, provides the ability to accept and mount designed modules, kits and sub-systems, provides the ability to be reconfigured to achieve specific mission profile set(s), the like, and/or various combinations thereof. Configurable common deck system 10 may be for an original equipment, or OE chassis 12 of a vehicle 14, as shown in in FIGS. 29 and 30. Configurable common deck system 10 may be designed and configured to fit any OE chassis for any desired vehicle. As examples, and clearly not limited thereto, configurable common deck system 10 may be configured to be installed on any vehicles or pickup trucks where the main cargo platform is a separate removable entity that is not attached to the passenger compartment body structure, including, but not limited to, from manufactures such as Toyota®, Honda®, Ford®, Chevrolet®, GMC®, RAM®, Isuzu®, Mazda®, Nissan®, or the like. Configurable common deck system 10 will remain structurally the same for each various vehicle of pickup truck but may just have different attachment locations 68 for various holes in the various OE chassis of the various vehicles.

Figure 29:
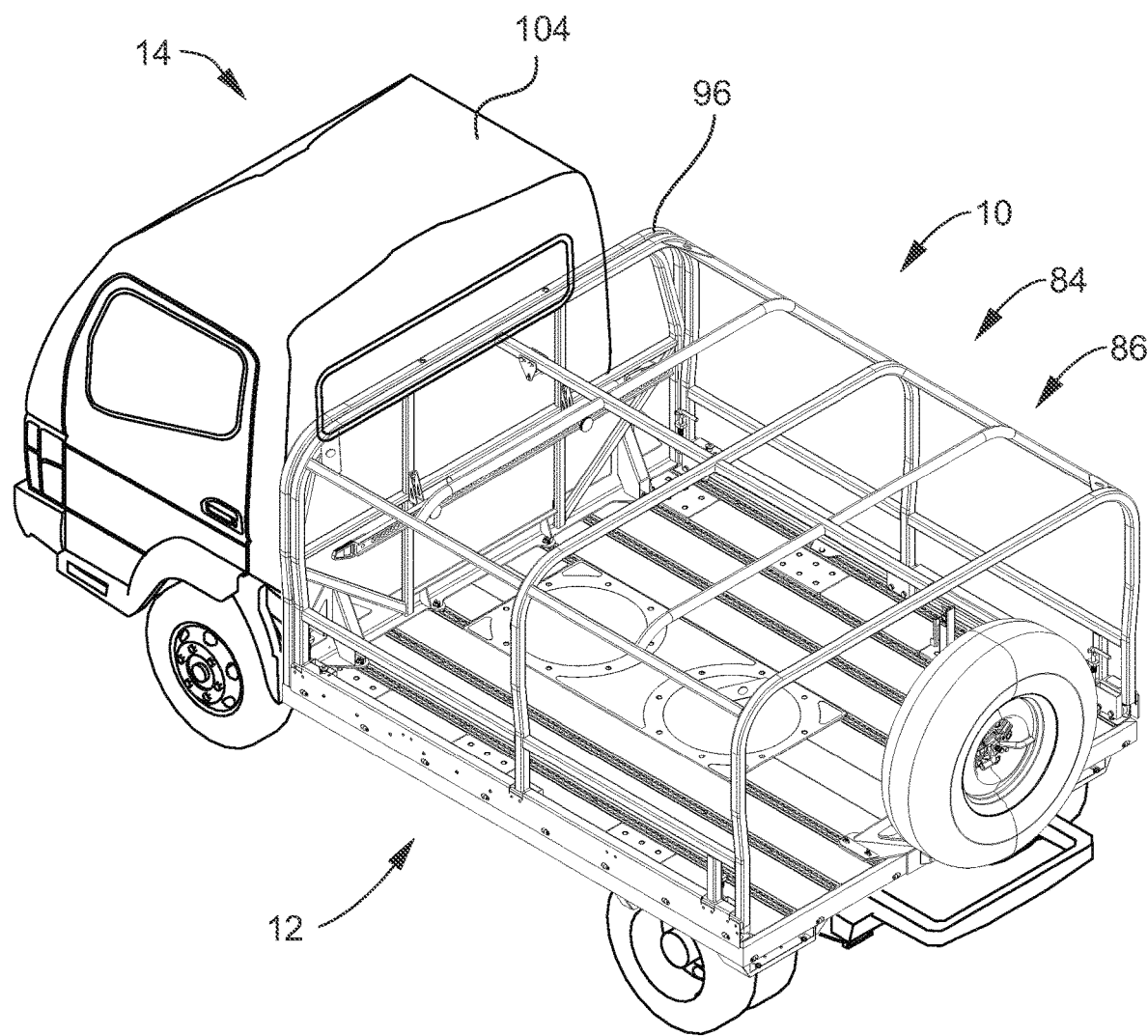
FIG. 29 is a perspective environmental view of the configurable common deck system according to select embodiments of the instant disclosure installed on an original equipment chassis of a vehicle.
Figure 30:
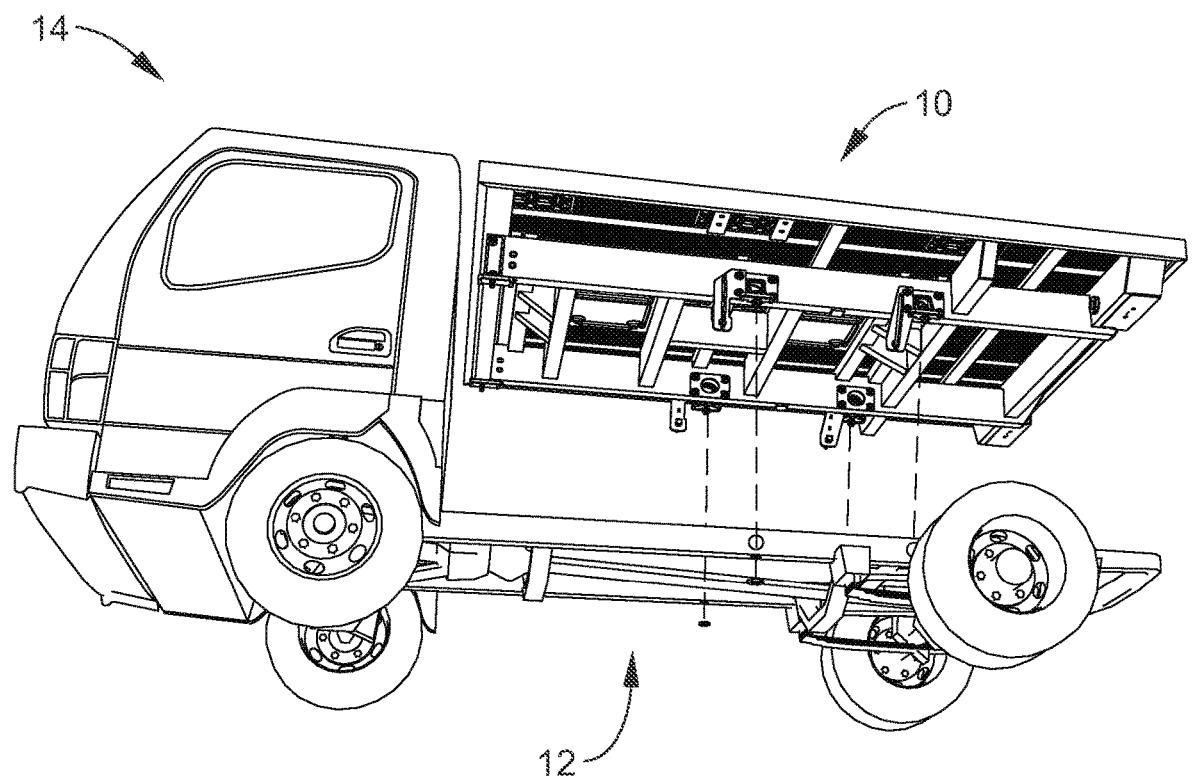
FIG. 30 is a perspective partially broken away view of the configurable common deck system according to FIG. 29 showing the configurable common deck system disassembled from the original equipment chassis of the vehicle.

Accordingly, the present disclosure solves the aforementioned limitations of the currently available OE cargo platforms, by providing configurable common deck system 10. Configurable common deck system 10 for OE chassis 12 of vehicle 14 may generally include support frame 16 and plurality of decking planks 18. Support frame 16 may be configured to be attached to OE chassis 12 of vehicle 14, like as shown in FIGS. 29 and 30. The plurality of decking planks 18 may be configured to cover support frame 16 to create deck 20. Wherein, deck 20 may have customizable size 22 with length 24, width 26 and height 28. The customizable size 22 of deck 20 may allow for various sizes and shapes of configurable common deck system 10 as may be desired for various applications or uses of configurable common deck system 10 on various OE chassis 12 of various vehicles 14. In select example embodiments, customizable size 22 of deck 20 may include length 24 of 64 inches, like the embodiments shown in FIGS. 1-13 and 29-30. In other select example embodiments, customizable size 22 of deck 20 may include length 24 of 84 inches, like the embodiments shown in FIGS. 13-28. In addition to various lengths 24 and widths 26, configurable common deck system 10 may also include a customizable height 28. This customizable height 28 may allow for deck 20 to sit higher of lower off of chassis 12 of vehicle 14. The decking planks 18 and fame 16 may be made from any desirable material for configurable common deck system 10. In select embodiments, decking planks 18 and frame 16 may be made from an aluminum material. As an example, and clearly not limited thereto, in possibly preferred embodiments the decking planks 18 and frame 16 may be made from an aluminum 6061 material or an aluminum 6063 material, or combinations thereof. Decking planks 18 may be positioned and configured in any orientation, length, thickness, the like, etc. to create deck 20. As examples, and clearly not limited thereto, in select embodiments decking planks 18 may be provided in thicknesses from 0.5 inches to 4 inches. As another example, and clearly not limited thereto, in possibly preferred embodiments, decking planks 18 may have a thickness of 1.5 inches or approximate thereto.

Plurality of anchor tracks 30 may be included in configurable common deck system 10. Anchor tracks 30 may be for providing customizable attachment points on deck 20, like for anchoring or installing various cargo, weaponry, mounted modules, kits, subsystems, or the like on top of deck 20 of configurable common deck system 10. The plurality of anchor tracks 30 may be configured for attaching anything onto the deck, including, but not limited to, any modules, kits and/or sub-systems at various desired locations on deck 20. In select possibly preferred embodiments, as shown in the Figures, anchor tracks 30 may be recessed between decking planks 18 to create flat, clean surface on deck 20. However, the disclosure is not so limited, and in other possible embodiments, anchor tracks 30 may be on top of decking planks 18. The plurality of anchor tracks 30 may thus be configured for attaching modules, kits and subsystems at various desired locations on deck 20. In select embodiments, each of the plurality of anchor tracks 30 may be seat and cargo track fittings 40 configured for a single stud fitting, a double stud fitting and a triple stud fitting, like Ancra Seat and Cargo Tracks from Ancra Cargo of Erlanger, Ky. The plurality of anchor tracks 30 may be any type or size of anchor tracks and may include various track and securing hardware, including MSI Defense Solutions of Mooresville, N.C. track and securing hardware, or any other desired options. Anchor tracks 30 may be positioned and configured in any orientation, length, thickness, the like, etc. to create deck 20.

In select embodiments thereof, each of the plurality of anchor tracks 30 can include a single stud load capacity rating from 4,000 to 6,000 pounds for the single stud fitting, or a double or triple stud load capacity rating up to 10,000 pounds for the double stud fitting or the triple stud fitting. These load capacities may allow for the installation and support of various cargo, weaponry, mounted modules, kits, subsystems, or the like on top of deck 20 via anchor tracks 30. As examples, anchor tracks 30 may be configured for panel fittings, stanchion fittings, galley fittings, tiedown fittings, or a combination thereof for installing and supporting such panel fittings, stanchion fittings, galley fittings, tiedown fittings on various cargo, weaponry, mounted modules, kits, subsystems, or the like.

Attachment ring 60 or a plurality of attachment rings 60 may also be included in configurable common deck system 10. See FIGS. 2 and 14. Attachment rings 60 may be for providing a means for lifting deck 20, securing cargo on the deck, or the like. Attachment rings 60 may thus be configured for lifting deck 20, securing cargo on the deck, or combinations thereof. Attachment rings 60 may be optionally included with configurable common deck system 10 and/or attachment rings 60 may be removable from deck 20 to provide the customer with the options of including attachment rings 60 or not. In select embodiments, as shown in the Figures, configurable common deck system 10 may include four attachment rings 60 positioned approximate each corner 64 of deck 20. However, the disclosure is not so limited and any various number or location of attachment rings 60 may be included. The attachment ring 60 or rings 60 may be configured for lifting the deck, like for transporting the deck from one vehicle to another, or for transporting the deck to various locations. In addition, the attachment rings 60 may be utilized for securing cargo on the configurable common deck system 10. The attachment rings 60 may be configured to fold down flat with the decking planks 18 for creating a flat or smooth surface 146.

Support frame 16 may be included in configurable common deck system 10. Support frame 16 may be for providing the structure underneath and supporting decking planks 18 for creating deck 20. Support frame 16 may also provide a means or location for connecting configurable common deck system 10 to OE chassis 12 of vehicle 14. Support frame 16 may include any parts, or combination of parts, means and connections for supporting decking planks 18 to create deck 20 and/or for providing a means or location for connecting configurable common deck system 10 to OE chassis 12 of vehicle 14. In select embodiments, as shown in the Figures, support frame 16 may include a pair of longitudinal beams 66, a plurality of cross-beams 70, a plurality of supports 72, and a rigid outer deck frame 74. The pair of longitudinal beams 66 may run the length of deck 20. The pair of longitudinal beams 66 may include attachment locations 68 configured for attaching deck 20 to OE chassis 12. Pair of longitudinal beams 66 may be designed and configured to rest on OE chassis 12 and be secured thereto on top of OE chassis 12. The pair of longitudinal beams 66 may include holes and/or attachment locations 68 configured for attaching deck 20 to the OE chassis 12. These holes and/or attachment locations 68 may vary for each OE chassis 12. In addition, the spacing between each longitudinal beam 66 may vary for each OE chassis 12. The plurality of cross-beams 70 may interconnect the pair of longitudinal beams 66. The plurality of supports 72 may run the width of deck 20 and may be configured for supporting the plurality of decking planks 18 and the plurality of anchor tracks 30. In select embodiments, each of the attachment locations 68 on the pair of longitudinal beams 66 may include cantilever mount 76. The cantilever mounts 76 may each include tension bracket 78 having a hook and at least one attachment hole 80. The attachment holes 80 may be configured for securing the longitudinal beams 66 directly to the OE chassis 12 via bolts, or the like. The rigid outer deck frame 74 may support deck 20 and provide added rigidity to the structure. The plurality of decking planks 18 may be welded at all contact locations to the supports 72 and rigid outer deck frame 74. Although the Figures of the instant disclosure show a certain configuration for support frame 16, the disclosure is not so limited, and any desired configuration of support frame 16 may be use, including any configuration of support frame 16 for supporting various configurations, shapes, sizes, etc. of deck 20, including any integration plates 120, decking planks 18, attachment rings 60, bulkhead and rollbar assembly 96, cargo or equipment cover assembly 84, the like, etc.

Figure 1:
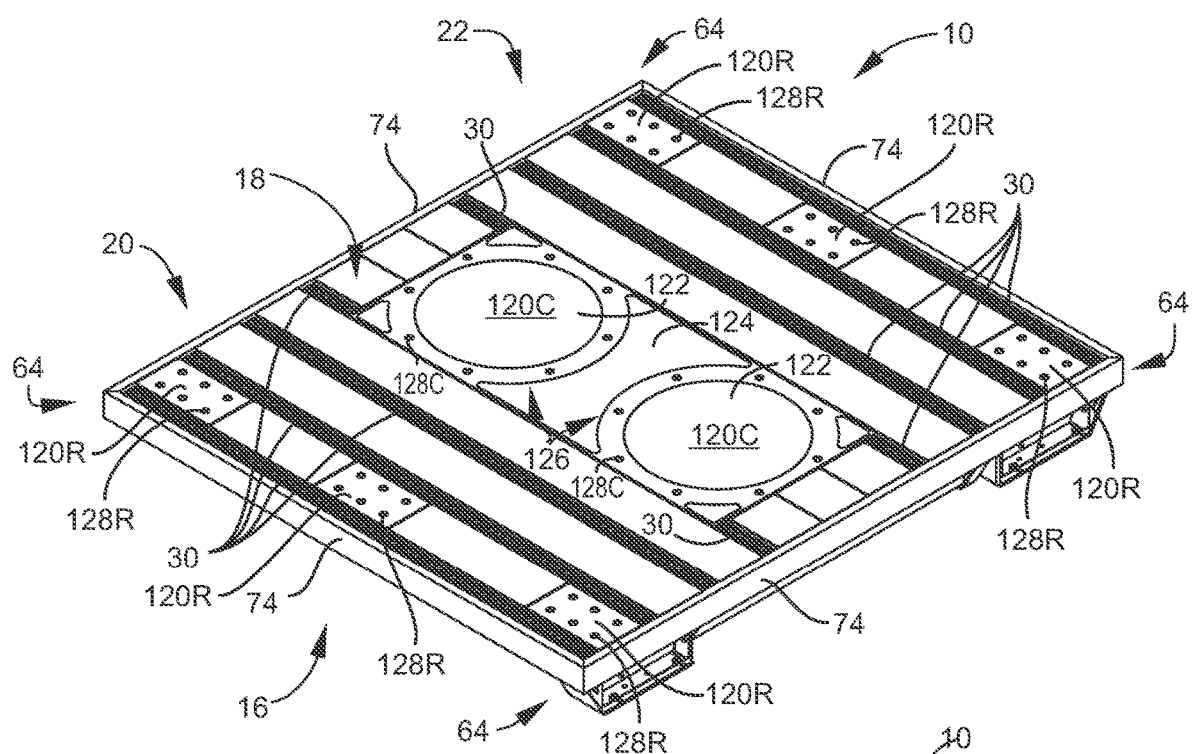
FIG. 1 is a top perspective view of the configurable common deck system according to select embodiments of the instant disclosure.
Figure 2:
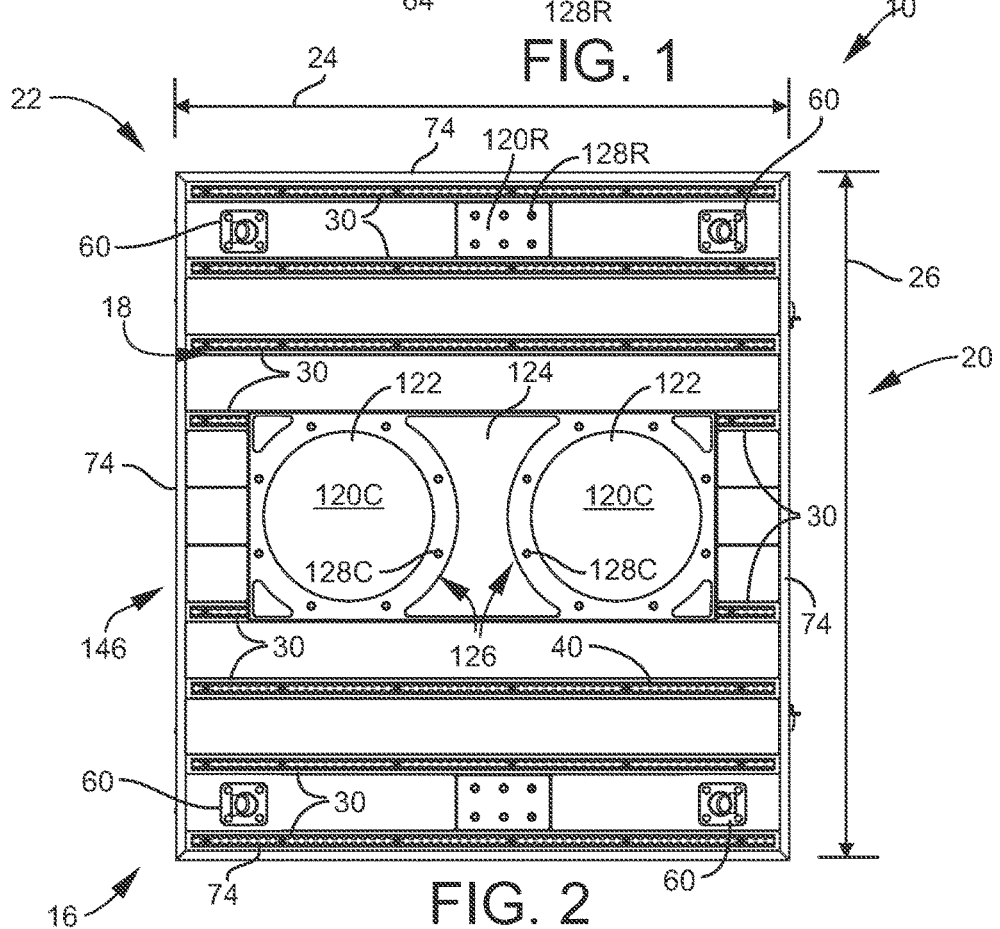
FIG. 2 is a top view of the configurable common deck system of FIG. 1.
Figure 3:
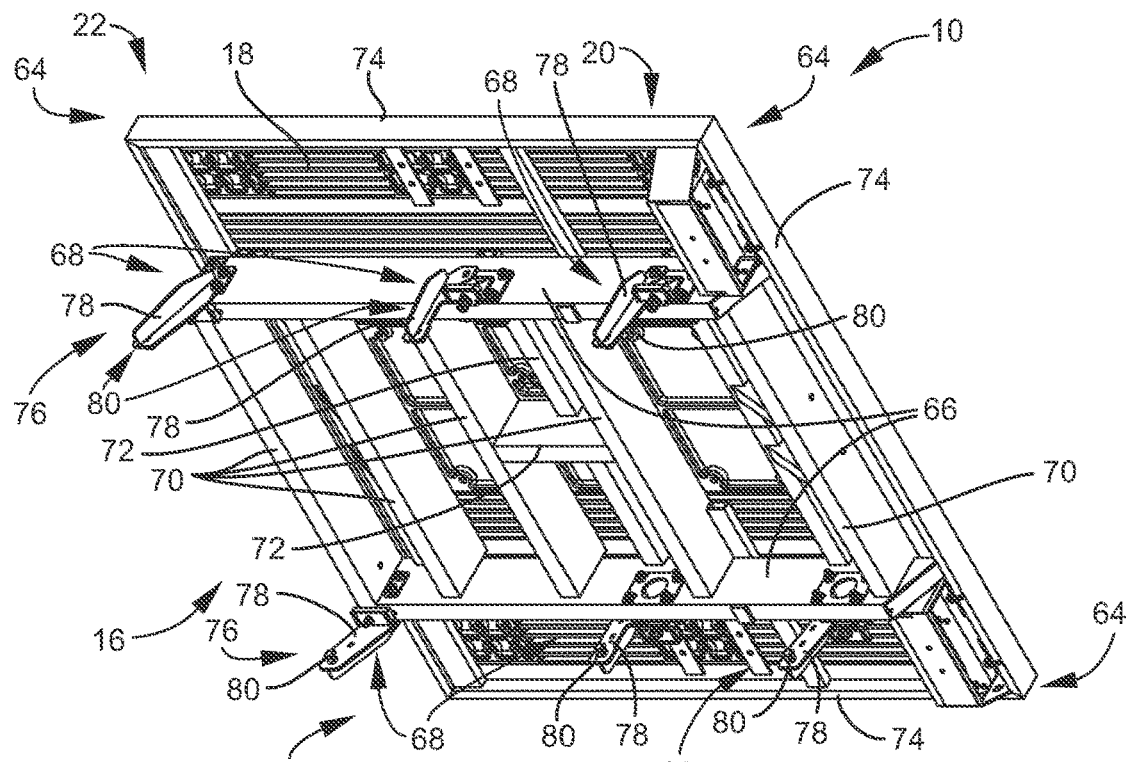
FIG. 3 is a bottom perspective view of the configurable common deck system of FIG. 1.
Figure 4:
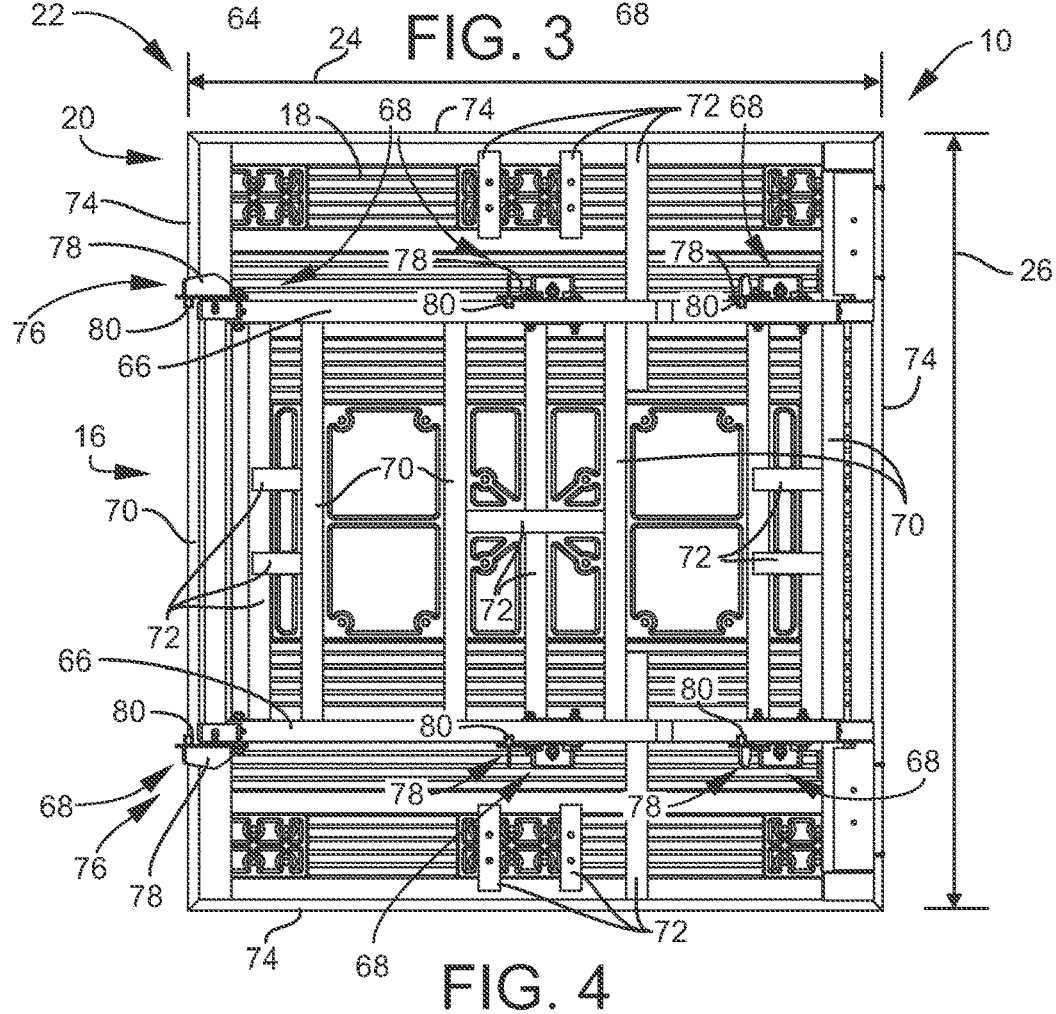
FIG. 4 is a bottom view of the configurable common deck system of FIG. 1.
Figure 5:
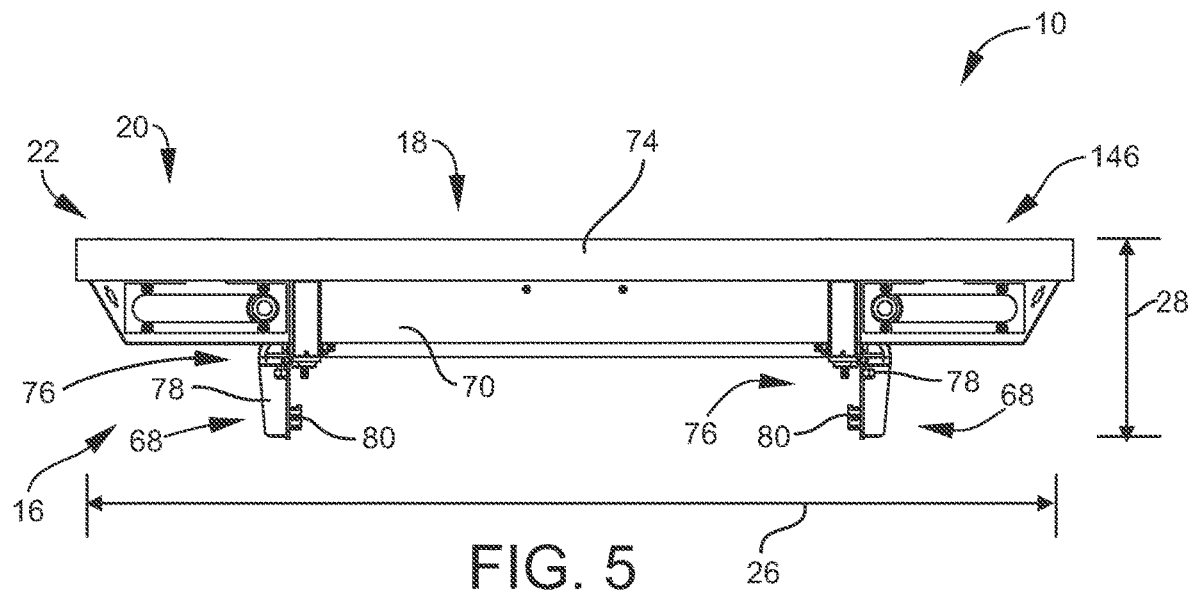
FIG. 5 is a side view of the configurable common deck system of FIG. 1.
Figure 6:
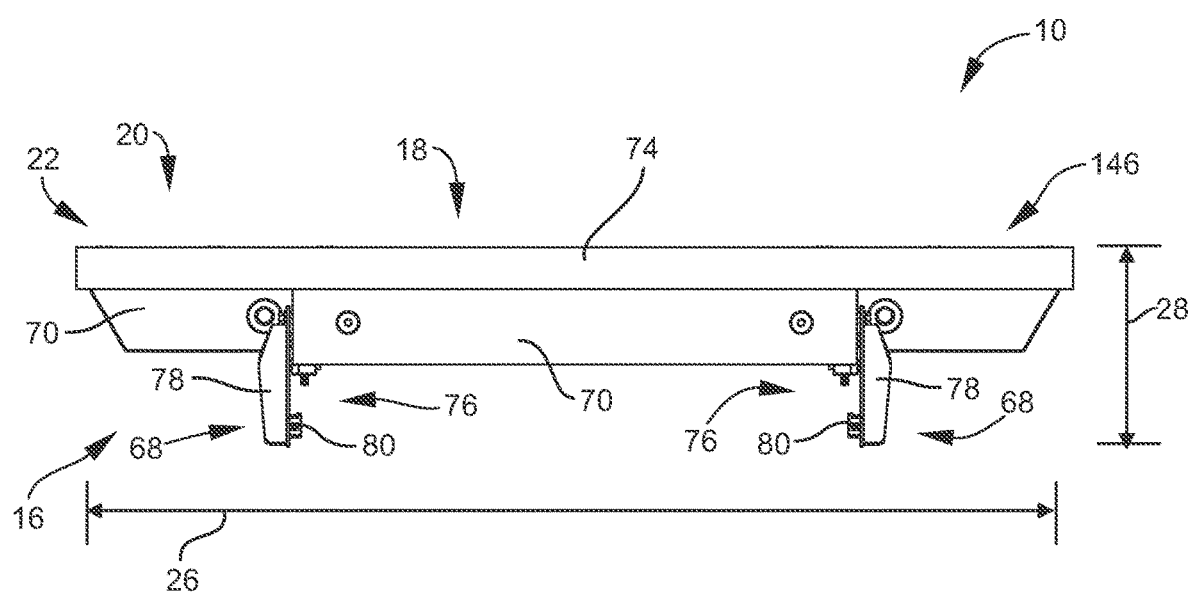
FIG. 6 is an end view of the configurable common deck system of FIG. 1.
Figure 7:
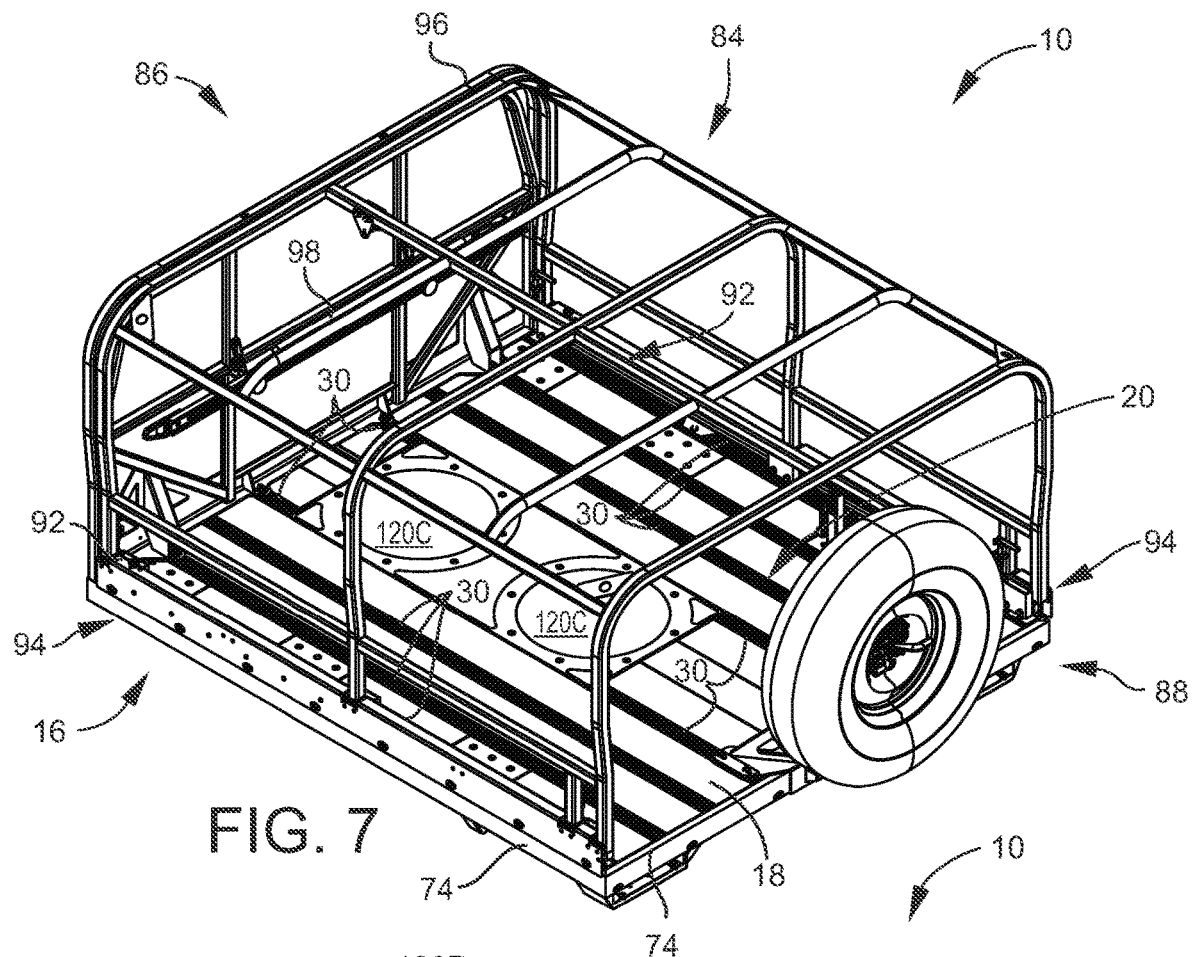
FIG. 7 is a top perspective view of the configurable common deck system according to select embodiments of the instant disclosure with a cargo or equipment cover assembly included in the closed position and positioned over the deck, and a bulkhead rollbar assembly included.
Figure 8:
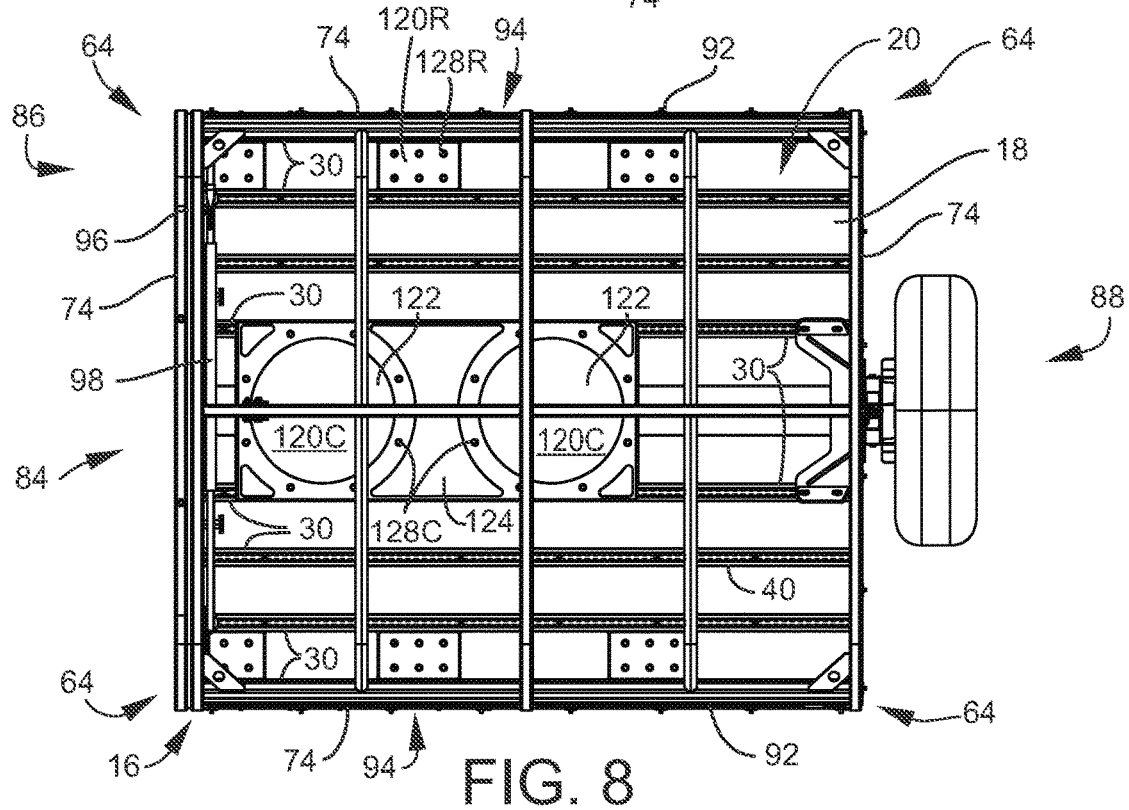
FIG. 8 is a top view of the configurable common deck system of FIG. 7 with the cargo or equipment cover assembly in the closed position.
Figure 9:
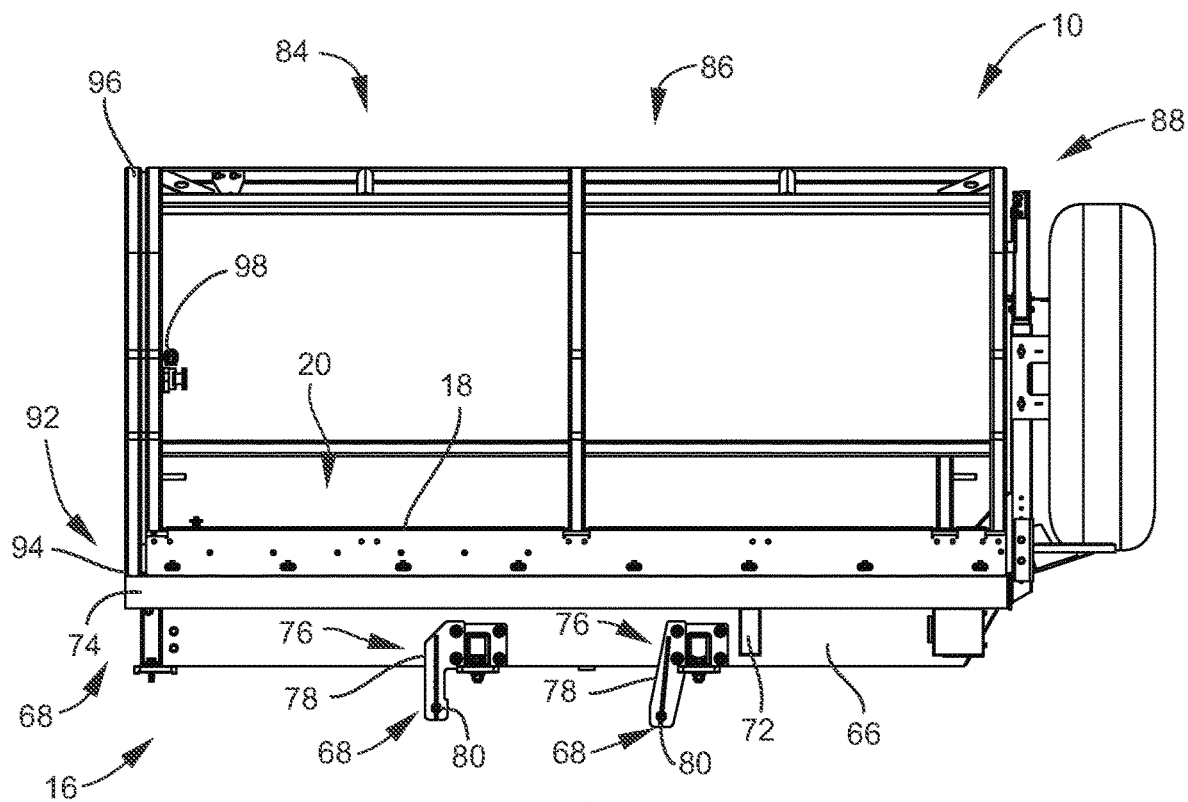
FIG. 9 is a side view of the configurable common deck system of FIG. 7 with the cargo or equipment cover assembly in the closed position.
Figure 10:
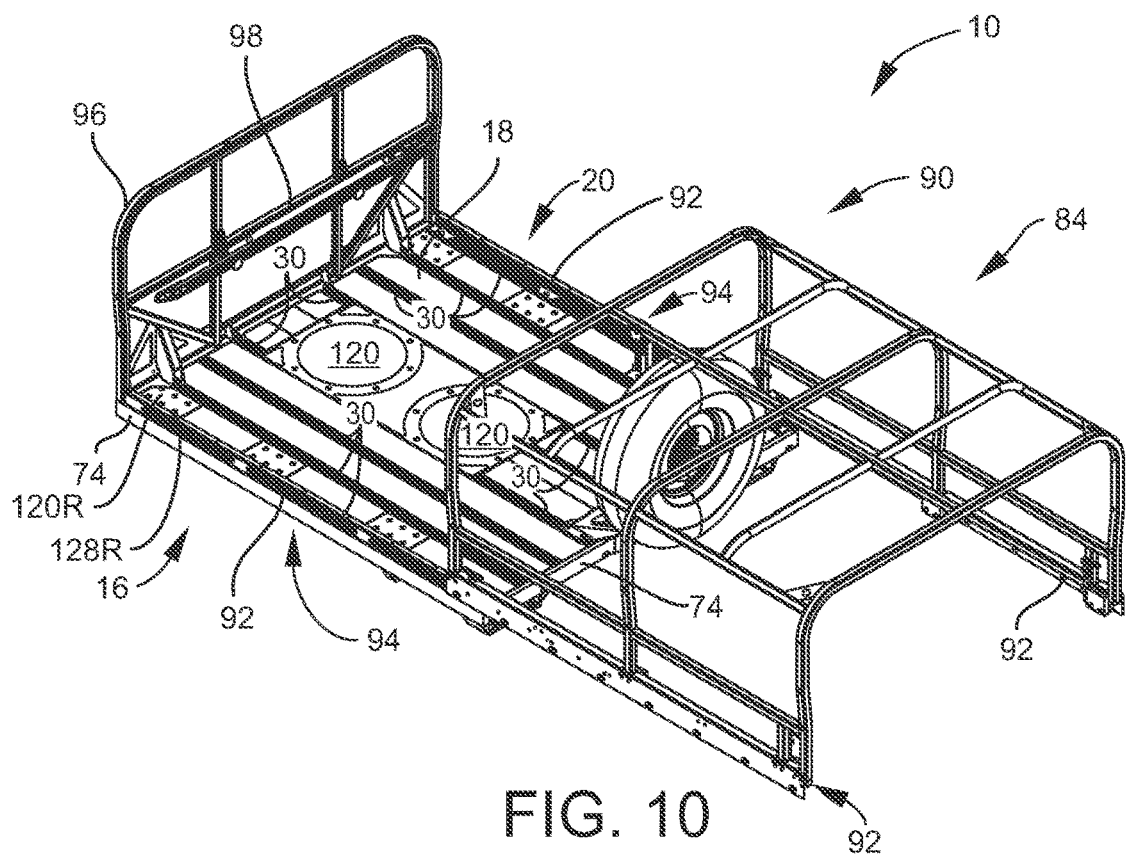
FIG. 10 is a side perspective of the configurable common deck system of FIG. 7 with the cargo or equipment cover assembly slid back off of the deck in the open position.
Figure 11:
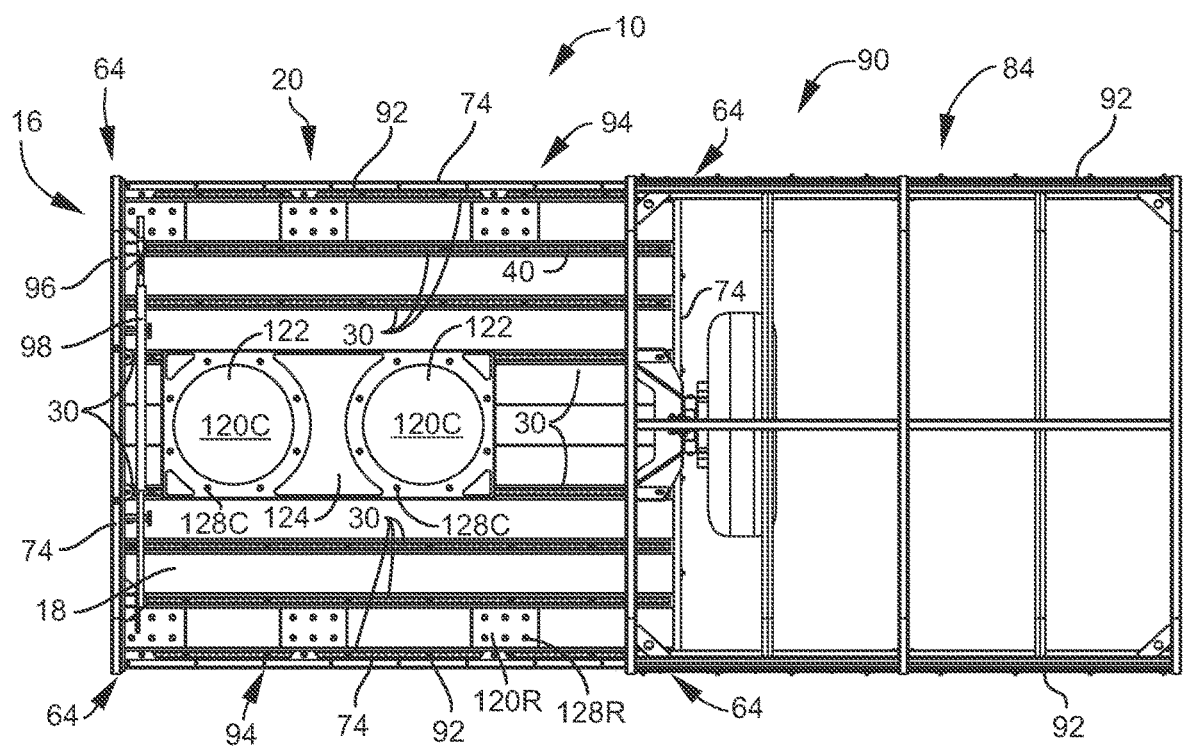
FIG. 11 is a top view of the configurable common deck system of FIG. 10 with cargo or equipment cover assembly slid back off of the deck in the open position.
Figure 12:
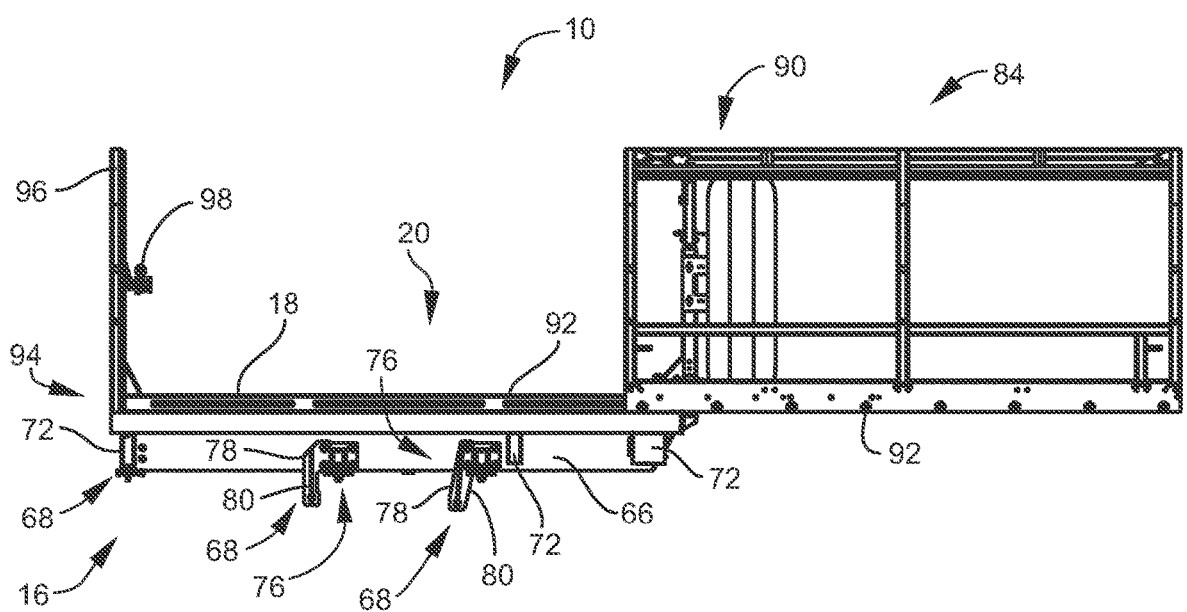
FIG. 12 is a side view of the configurable common deck system of FIG. 10 with the cargo or equipment cover assembly slid back off of the deck in the open position.
Figure 13:
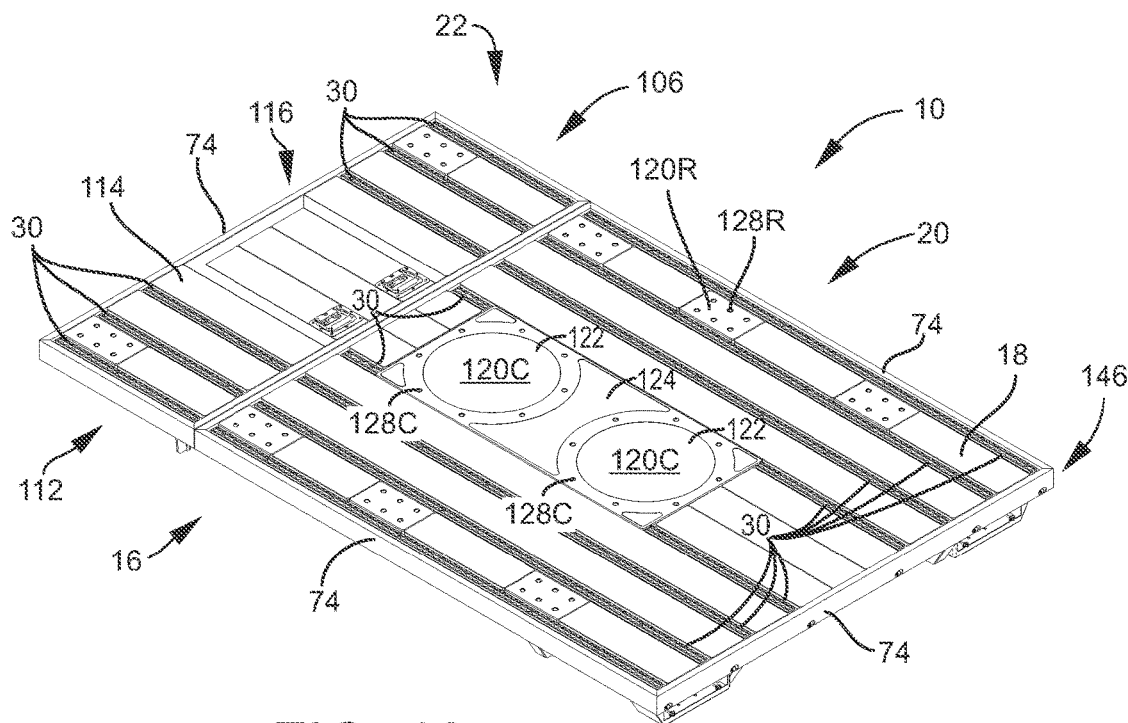
FIG. 13 is a top perspective view of the configurable common deck system according to select embodiments of the instant disclosure with an extension assembly included.
Figure 14:
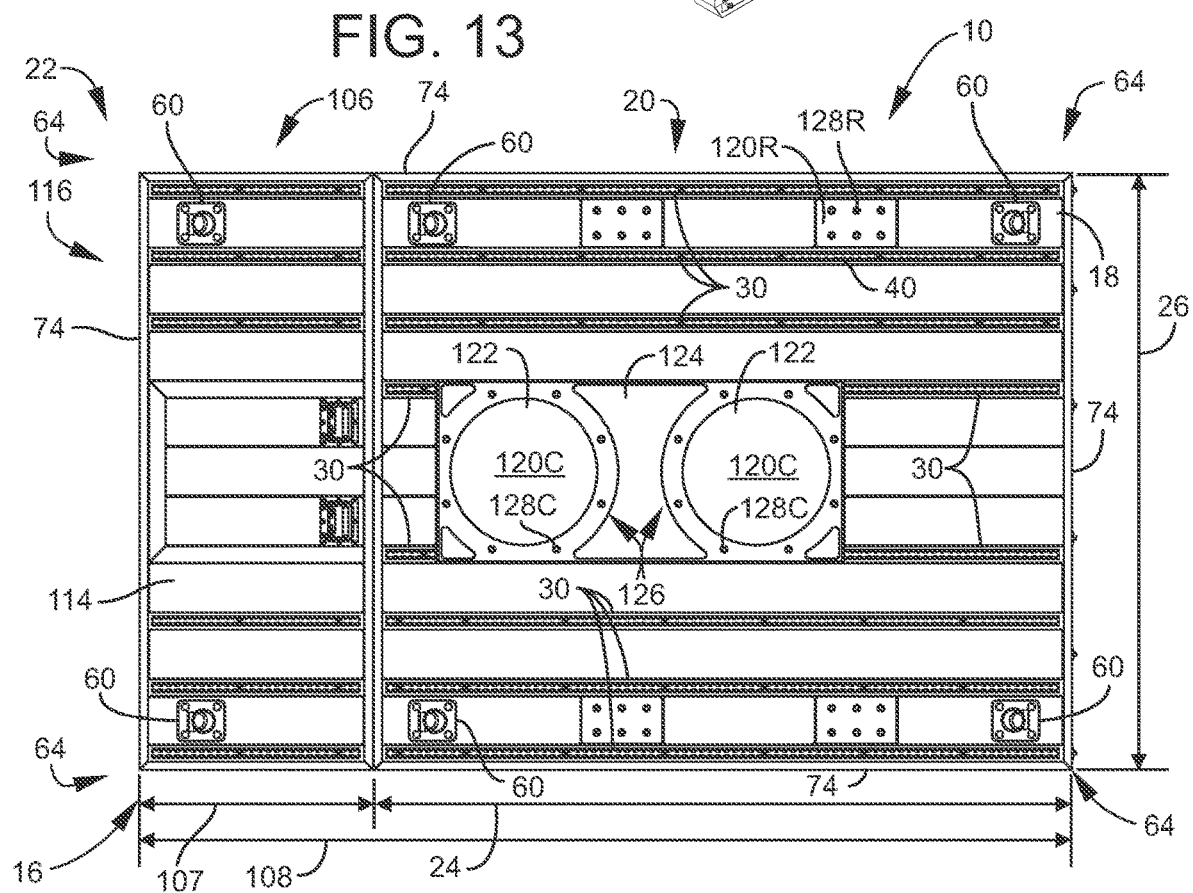
FIG. 14 is a top view of the configurable common deck system of FIG. 13 with the extension assembly included.
Figure 15:
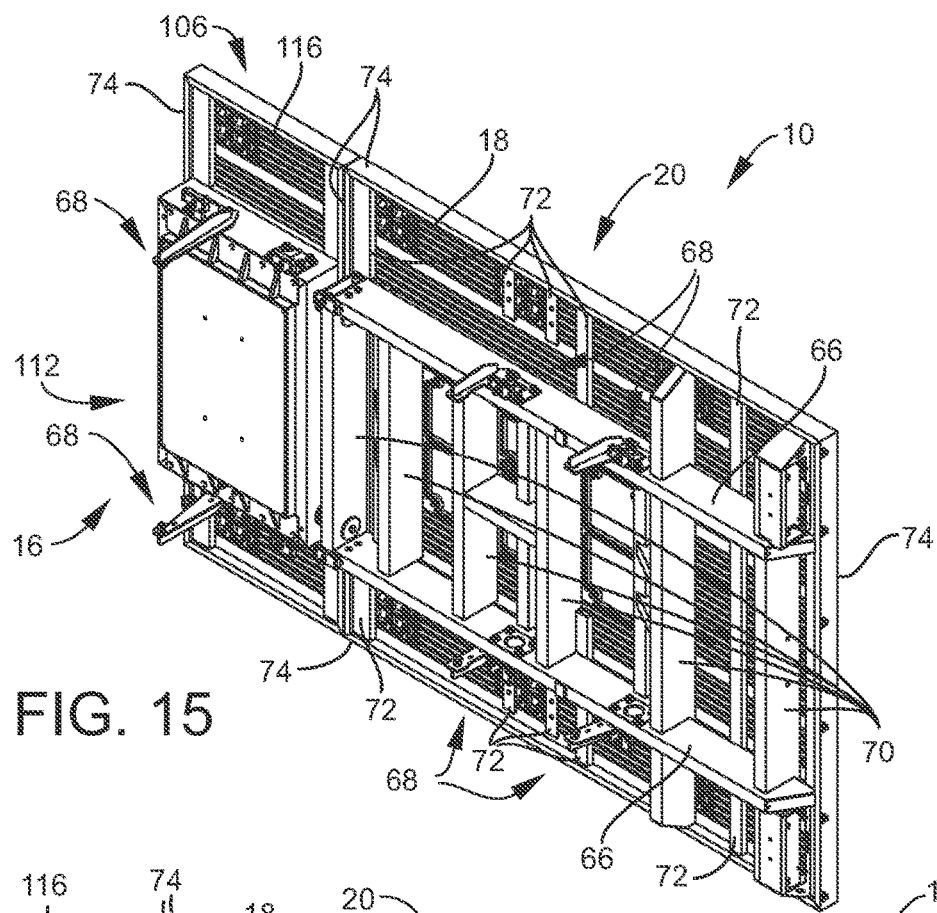
FIG. 15 is a bottom perspective view of the configurable common deck system of FIG. 13 with the extension assembly included.
Figure 16:
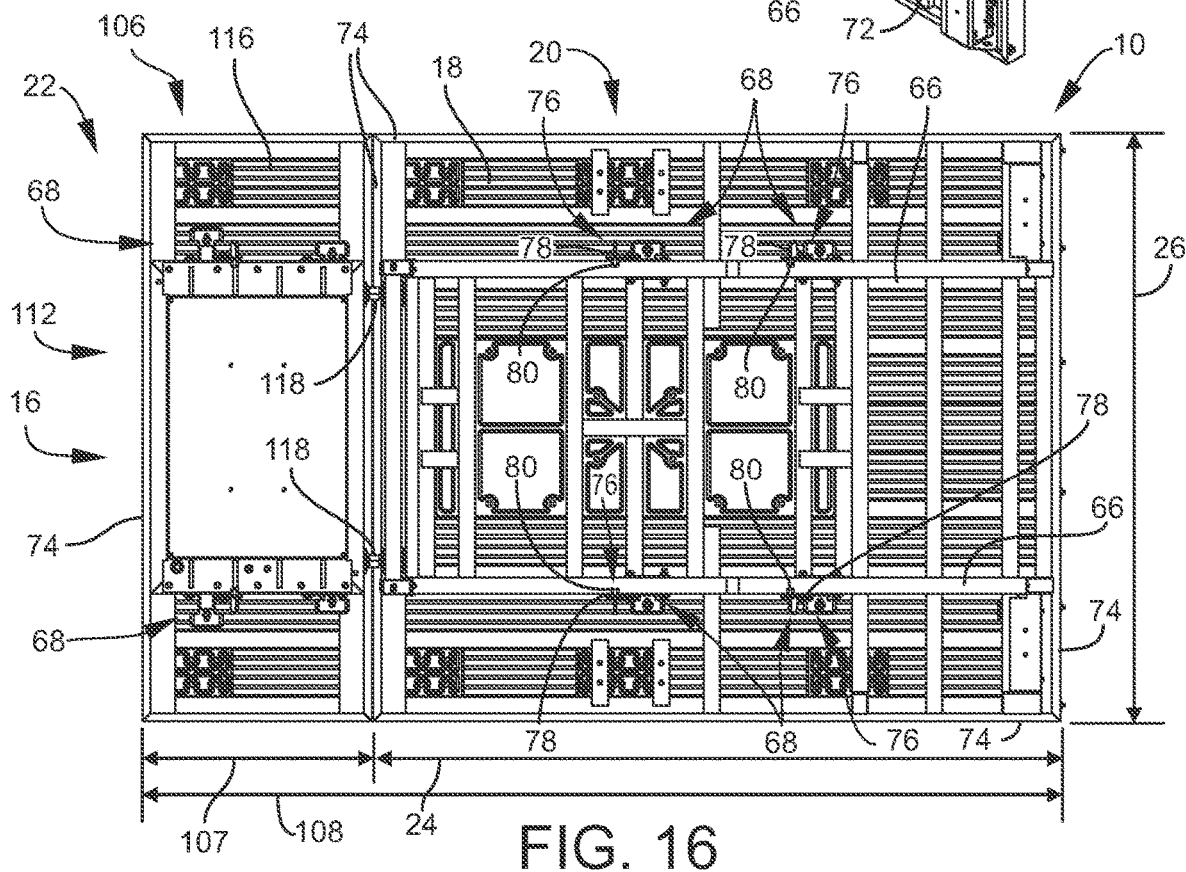
FIG. 16 is a bottom view of the configurable common deck system of FIG. 13 with the extension assembly included.
Figure 17:
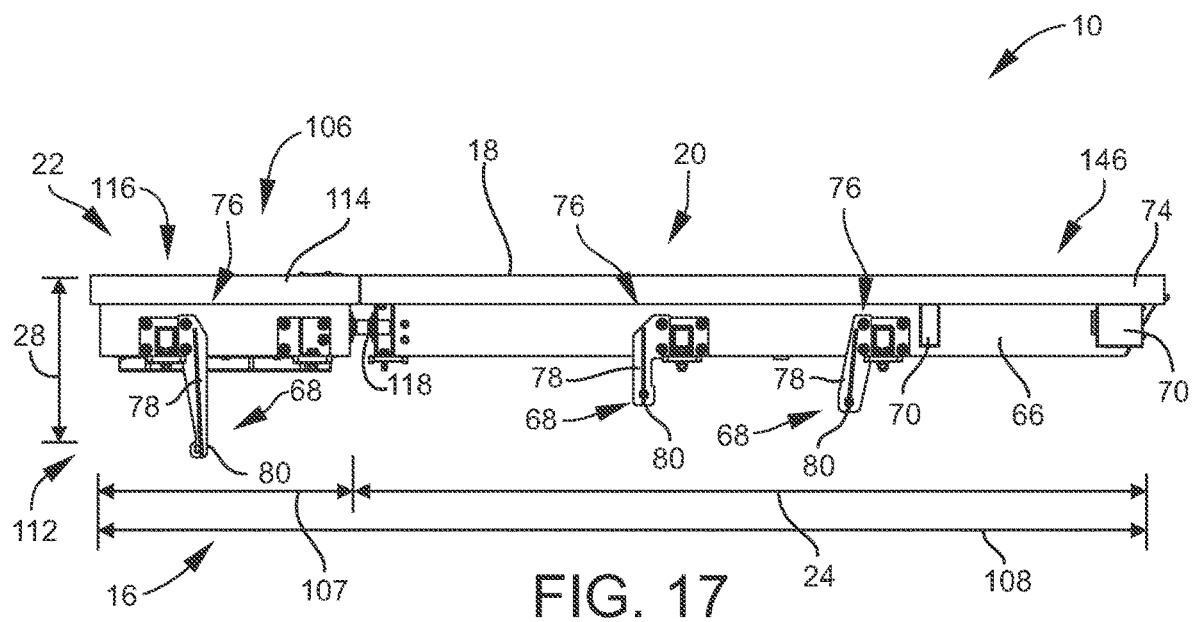
FIG. 17 is a side view of the configurable common deck system of FIG. 13 with the extension assembly included.
Figure 18:
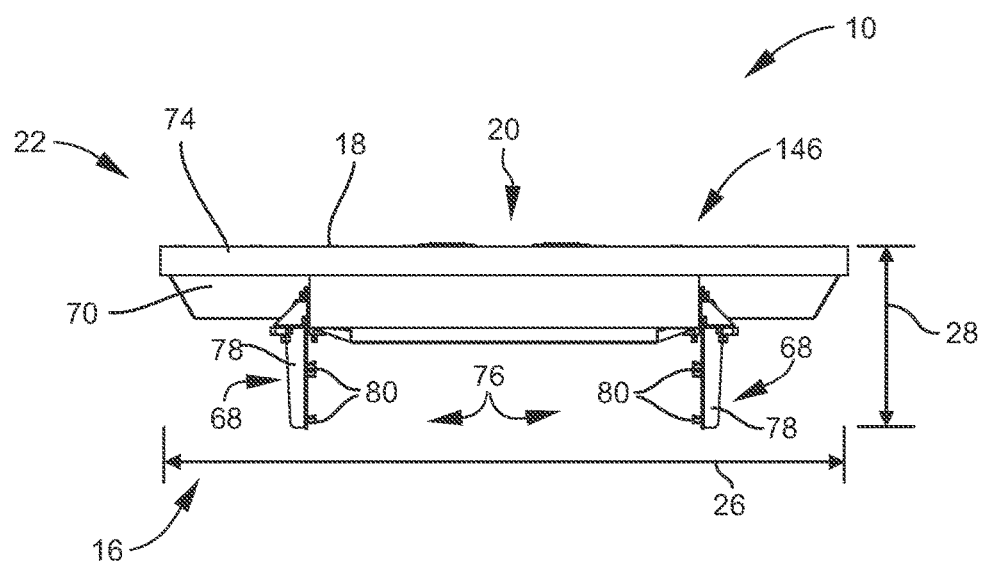
FIG. 18 is an end view of the configurable common deck system of FIG. 13 with the extension assembly included.
Figure 19:
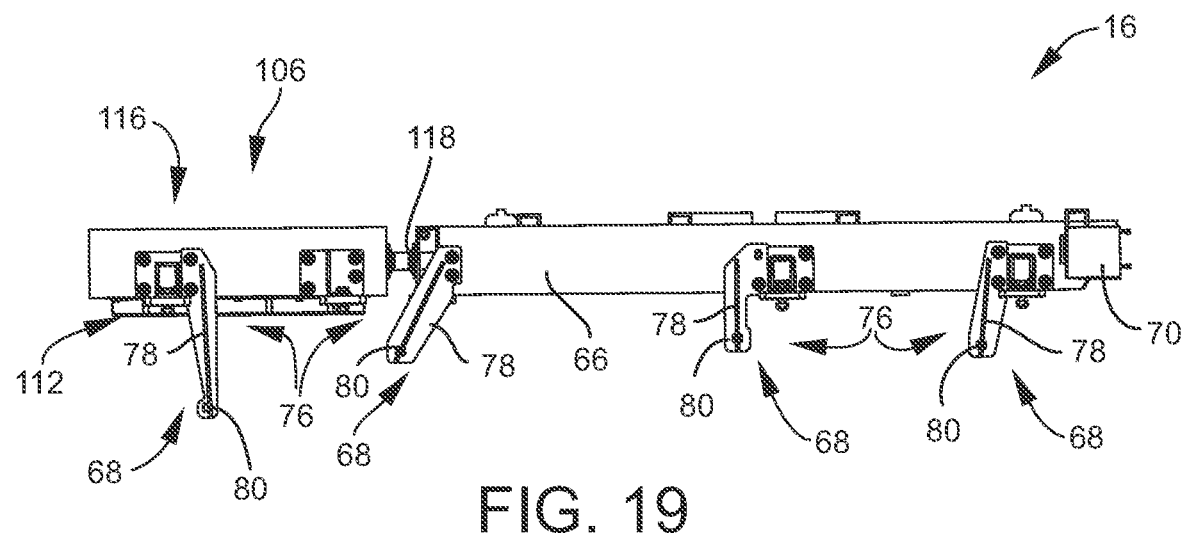
FIG. 19 is another side view of the configurable common deck system of FIG. 13 with the extension assembly included.
Figure 20:
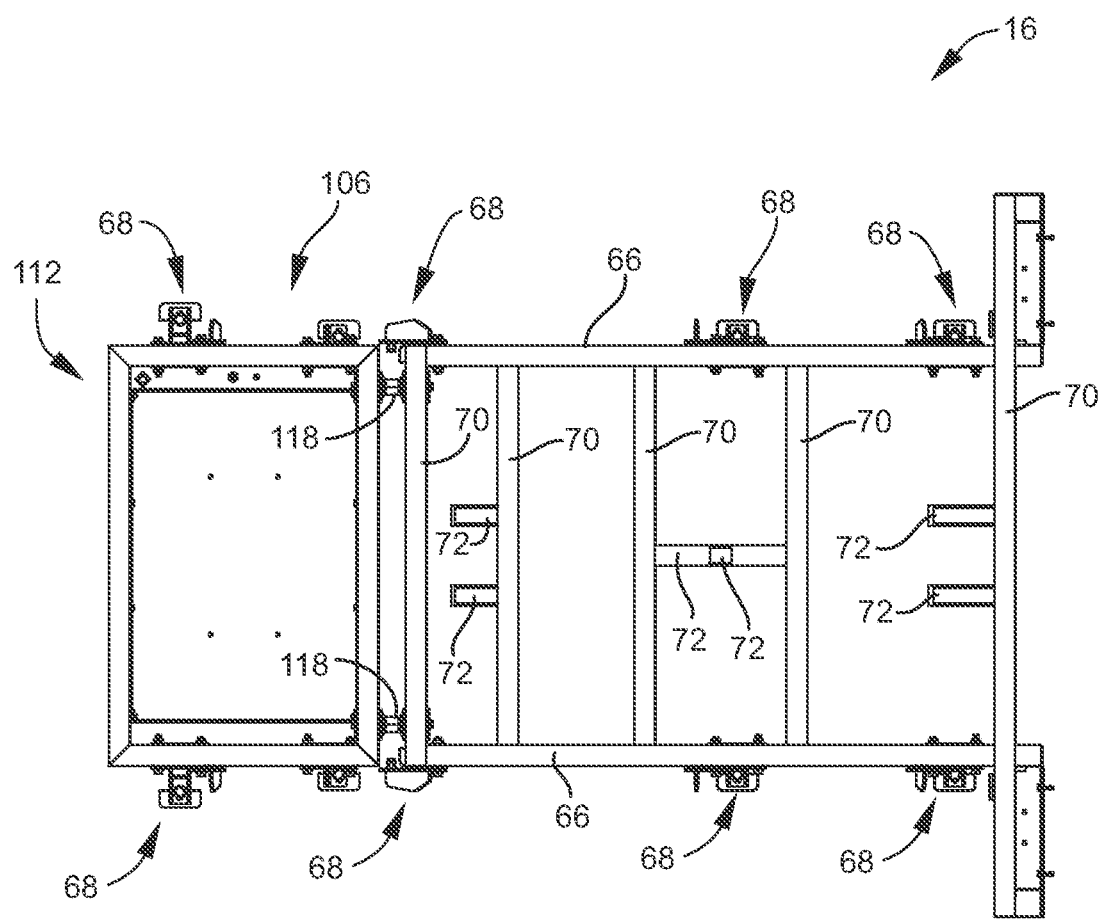
FIG. 20 is a top view of the configurable common deck system of FIG. 13 with the extension assembly included just showing the support frame with the decking planks removed.
Figure 21:
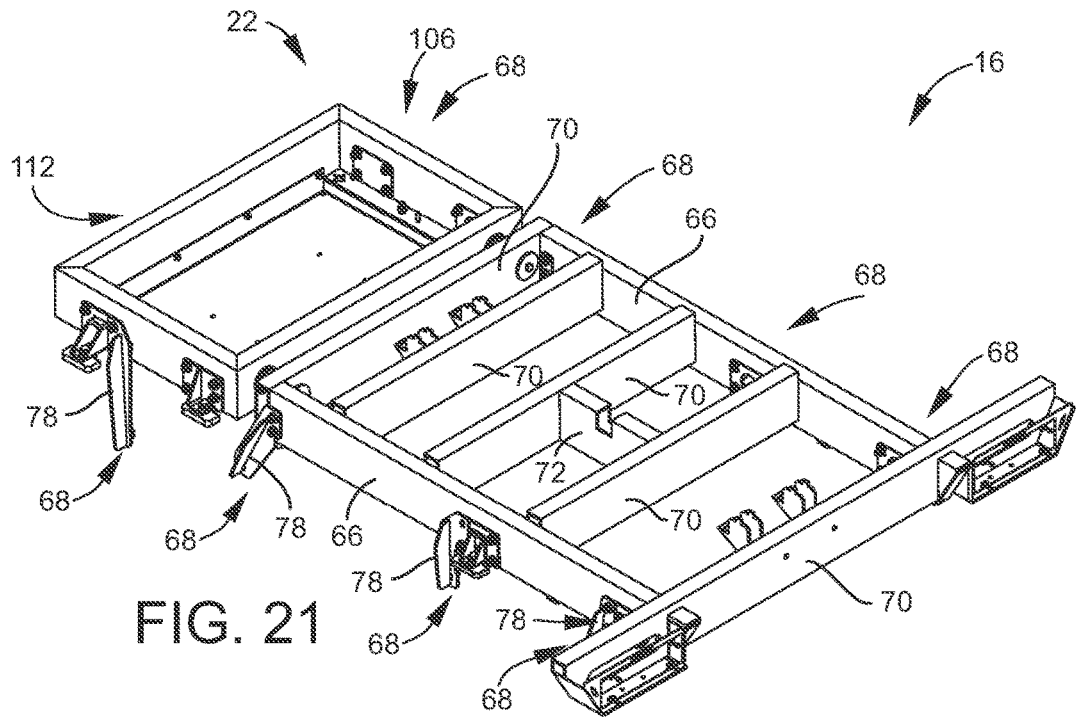
FIG. 21 is a top perspective view of the configurable common deck system of FIG. 13 with the extension assembly included just showing the support frame with the decking planks removed.
Figure 22:
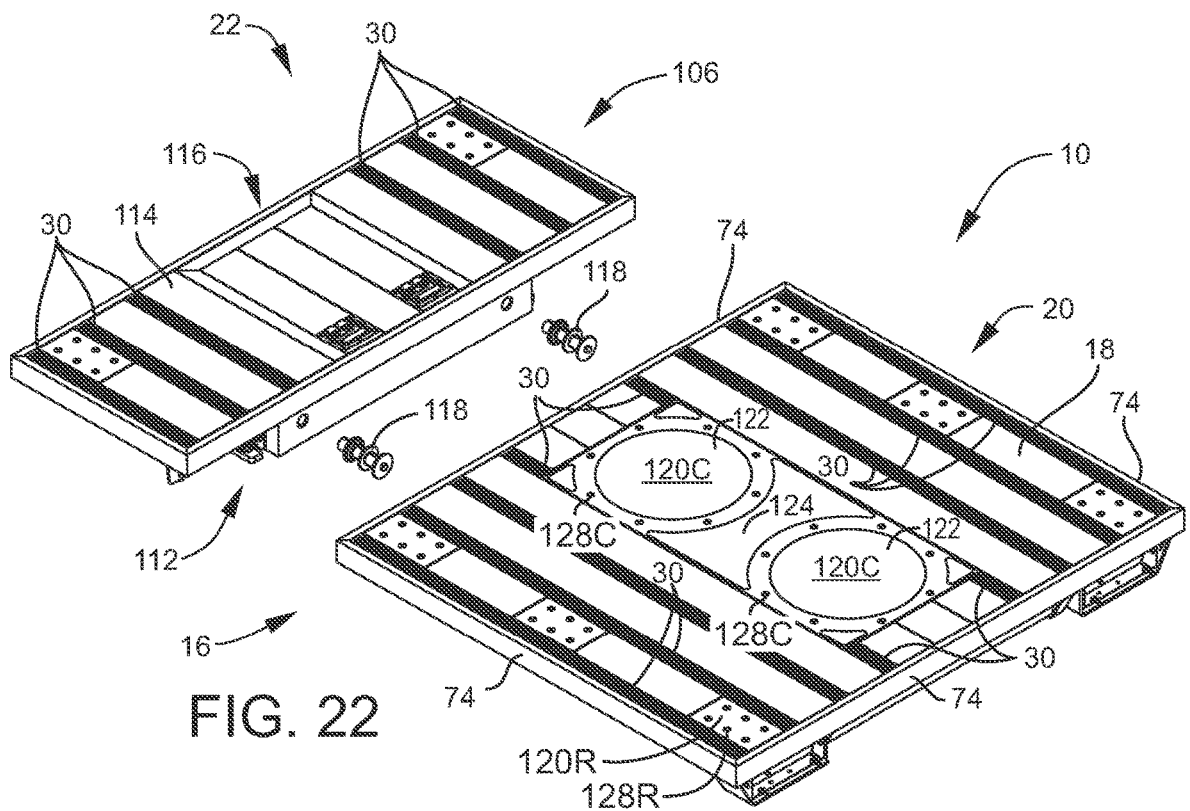
FIG. 22 is a top perspective view of the configurable common deck system of FIG. 13 with the extension assembly included and partially disassembled.
Figure 23:
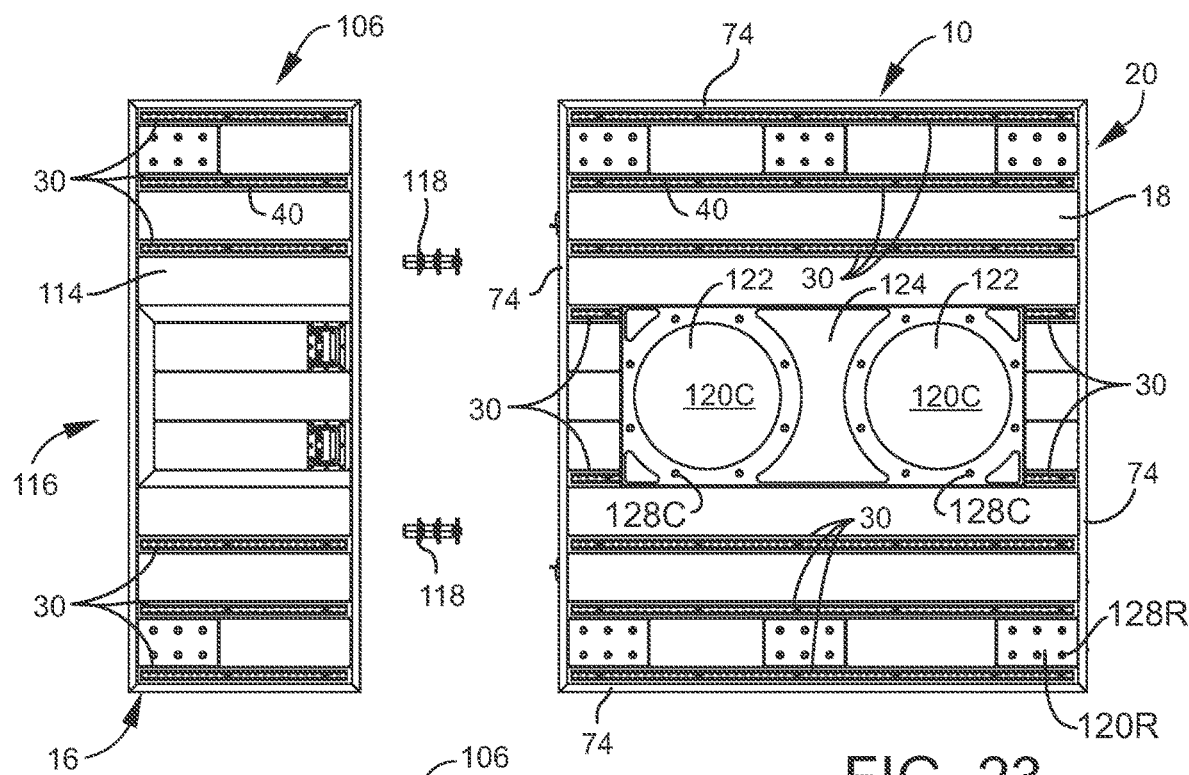
FIG. 23 is a top view of the configurable common deck system of FIG. 22 with the extension assembly included and partially disassembled.
Figure 24:
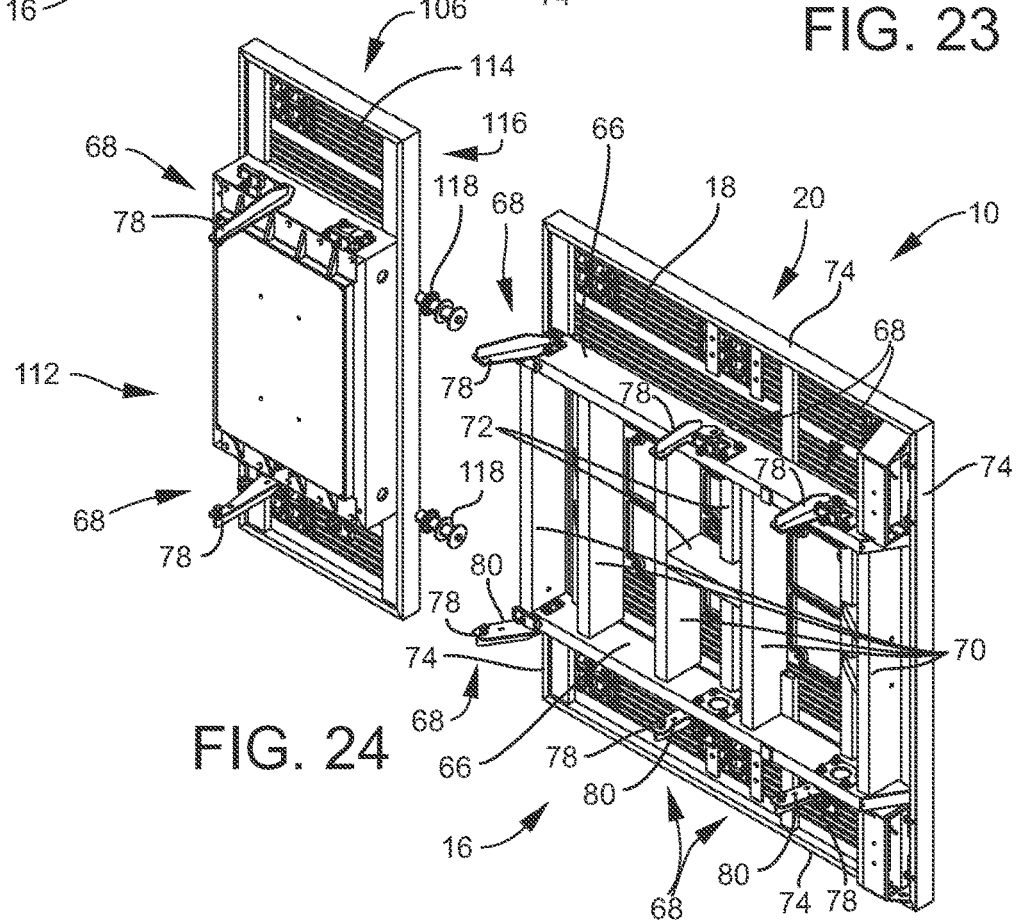
FIG. 24 is a bottom perspective view of the configurable common deck system of FIG. 22 with the extension assembly included and partially disassembled.
Figure 25:
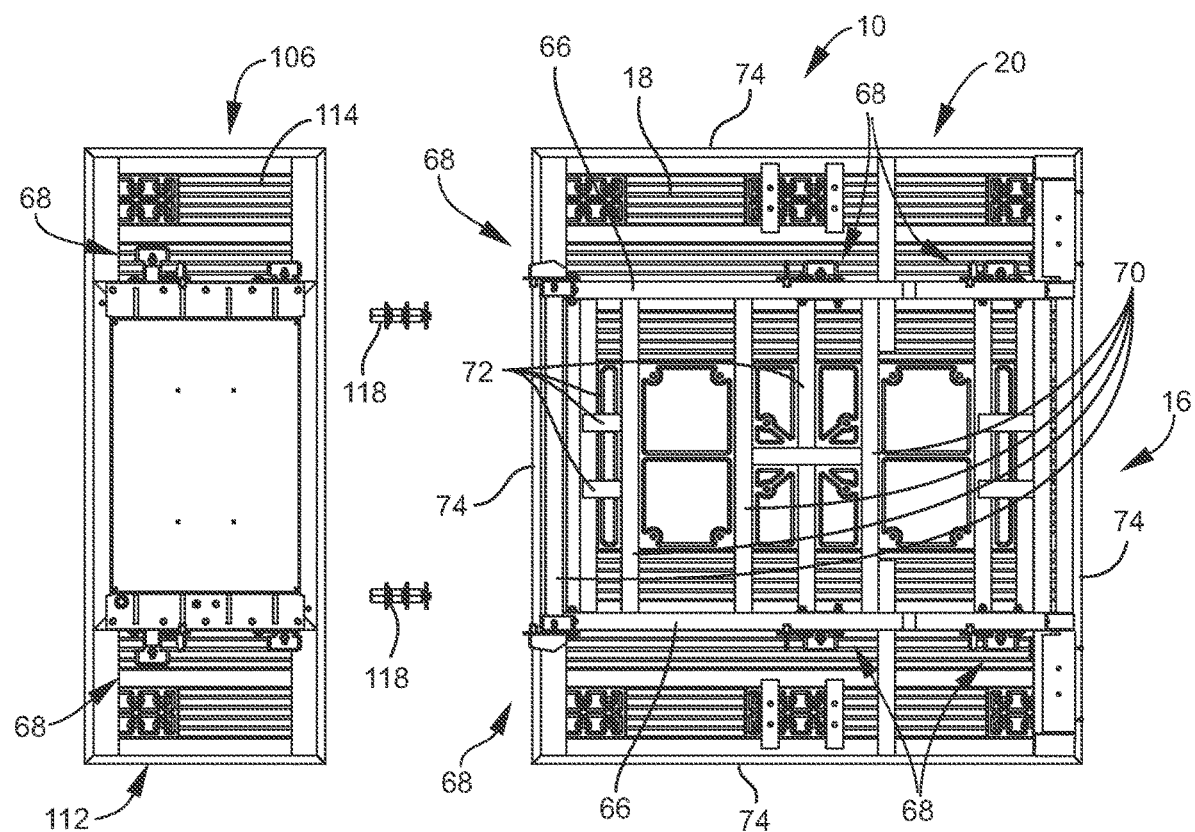
FIG. 25 is a bottom view of the configurable common deck system of FIG. 22 with the extension assembly included and partially disassembled.
Figure 26:
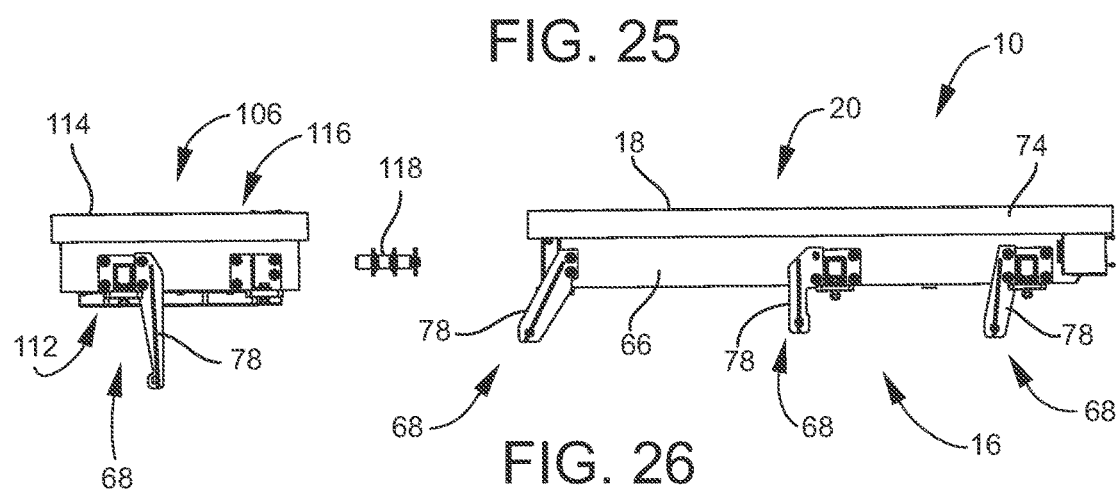
FIG. 26 is a side view of the configurable common deck system of FIG. 22 with an extension assembly included and partially disassembled.
Figure 27:
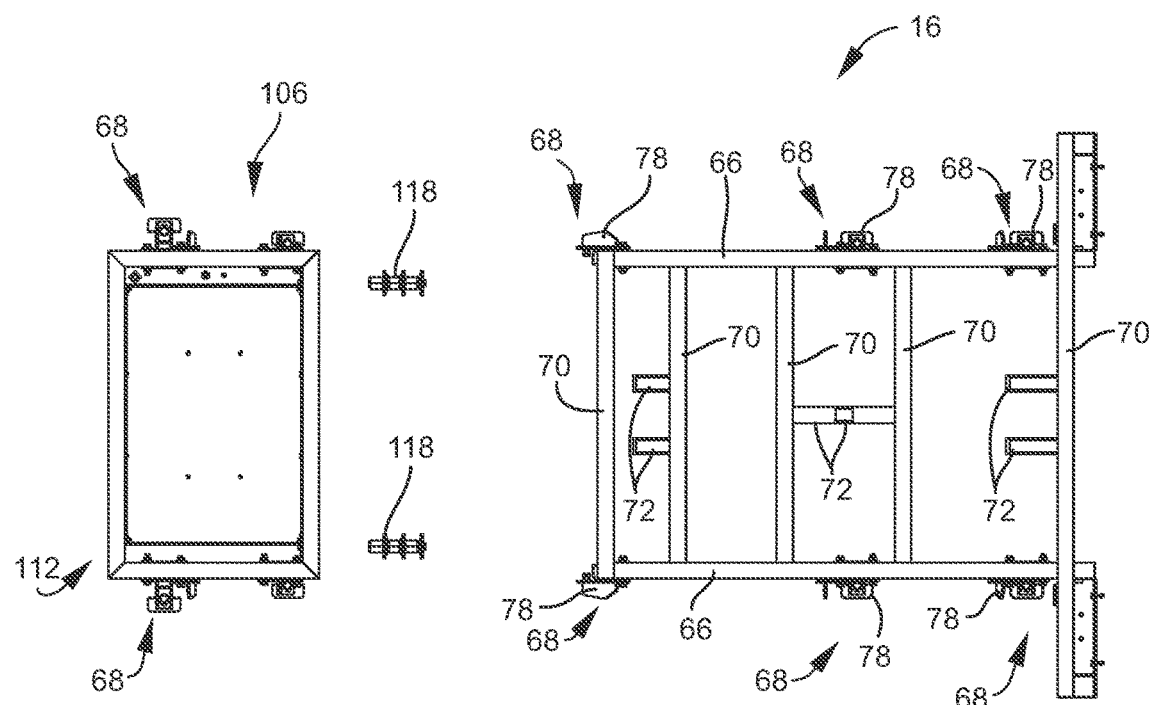
FIG. 27 is a top view of the configurable common deck system of FIG. 22 with the extension assembly included and partially disassembled just showing the support frame with the decking planks removed.
Figure 28:
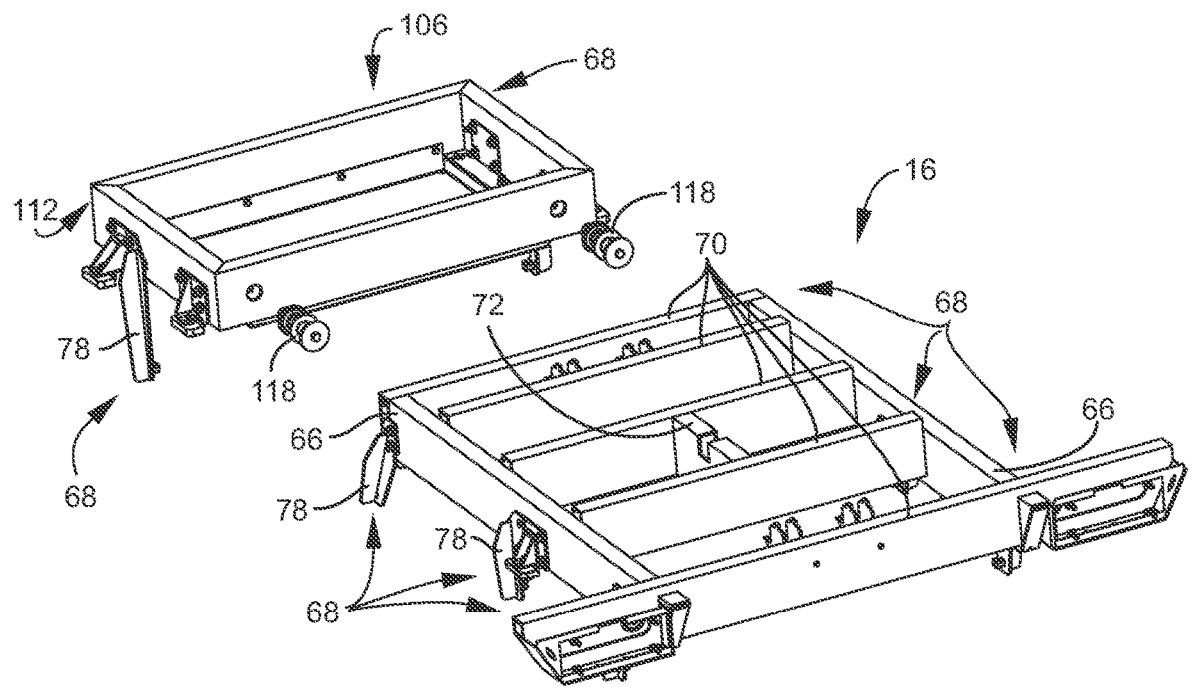
FIG. 28 is a top perspective view of the configurable common deck system of FIG. 22 with the extension assembly included and partially disassembled just showing the support frame with the decking planks removed.

Referring now specifically to FIGS. 7-12 and 29, another feature of the disclosed configurable common deck system 10 may be that it can include cargo or equipment cover assembly 84. Cargo or equipment cover assembly 84 may be for covering deck 20 for any various reasons and/or may be for providing a rigid structure or frame above deck 20 for mounting or supporting various devices, items or weapons. Cargo or equipment cover assembly 84 may be configured for covering deck in closed position 86, as shown in FIGS. 7, 8, 9 and 29. Likewise, cargo and equipment cover assembly 84 may be configured to open to rear 88 of deck 20 in open position 90 for exposing deck 20, as shown in FIGS. 10, 11 and 12. Cargo or equipment cover assembly 84 may open or close by any various means or devices. The cargo or equipment cover assembly 84 may open and close by any means, including but not limited to, sliding open, hinging or pivoting open, flipping open, the like, etc., including in any direction, like longitudinally with deck 20 (as shown in the Figures), transversely with deck 20, or any other directions or orientations. In select embodiments, cargo or equipment cover assembly 84 may include a pair of slide tracks 92 approximate outer longitudinal edges 94 of deck 20. The slide tracks 92 may be configured to allow cargo or equipment cover assembly 84 to slide from closed position 86 to open position 90. In select embodiments, as shown in the Figures, the pair of slide tracks 92 may be positioned approximate the outer longitudinal edges 94 of deck 20 and may be attached to deck 20 via anchor track 30 on or approximate these outer longitudinal edges 94 of deck 20. In other select embodiments, the pair of slide tracks 92 may be positioned approximate the outer transverse edges of deck 20 and may be attached to deck 20 via anchor track 30 on or approximate these outer transverse edges 94 of deck 20, where cargo or equipment cover assembly 84 may slide open transversely from vehicle 14 to one side or the other.

Still referring specifically to FIGS. 7-12 and 29, another feature of configurable common deck system 10 may be the inclusion of bulkhead rollbar assembly 96 in select embodiments. Bulkhead rollbar assembly 96 may be configured for attaching and/or supporting equipment 98, weaponry, the like, or combinations thereof near cab 104 of vehicle 14.

Now referring specifically to FIGS. 14-28, configurable common deck system 10 may include module extension assembly 106 in select embodiments. Module extension assembly 106 may be for providing extra length to deck 20 of configurable common deck system 10 to create extended length 108. Module extension assembly 106 may also allow for the interchangeability of the same deck 20 from smaller or shorter OE chassis 12 to larger or longer OE chassis of various vehicles 14. In addition, module extension assembly 106 may be for providing deck 20 with extended length 108 on the same length OE chassis 12 for just providing extra length to deck 20 on the same vehicle 12. As examples, module extension assembly 106 may be configured to provide added length 107 to deck 20, whereby, module extension assembly 106 may be attached to deck 20 for mounting on longer cargo and/or troop carrying OE vehicles, where the same deck 20 can thereby be used on the longer cargo and/or troop carrying OE vehicles and shorter cargo and/or troop carrying OE vehicles (without the module extension assembly 106). Module extension assembly 106 may thus be configured to provide added length 107 to deck 20 for mounting on longer OE chassis 108 to create extended length 108. Wherein, when module extension assembly 106 is attached to deck 20, deck 20 may be configured to be used on a longer OE chassis 12 or on the same OE chassis 12 for just providing a longer deck 20 on the same vehicle 12. In addition, when module extension assembly 106 is not attached to deck 20, the same deck 20 may be configured to be used on a shorter OE chassis 12. In select embodiments, as shown in the Figures, module extension assembly 106 may include extension frame 112, plurality of extended decking planks 114, and pair of connection rods 118. Extension frame 112 may be configured to attach to OE chassis 12 of vehicle 14. The plurality of extended decking planks 114 may be configured to cover extension frame 112 to create extension deck 116. The pair of connection rods 118 may be configured to connect support frame 16 of deck 20 to extension frame 112 of extension deck 116. The pair of connection rods 118 may be configured for locating, connecting and stiffening the connection between module extension assembly 106 and deck 20.

Another feature of the disclosed configurable common deck system may be the inclusion of integration plate 120, or multiple integration plates 120 on deck 20 as shown in the select embodiments of configurable common deck system 10. See FIGS. 1, 2, 7, 8, 10, 11, 13, 14, 22, and 23. Each integration plate 120 may be for providing a location for providing another means for configuring deck 20 for attachment to various cargo, weaponry, mounted modules, kits, subsystems, or the like on top of deck 20 of configurable common deck system 10. In select embodiments, each integration plate 120 may be flush mounted to decking planks 18 and anchor tracks 30, wherein top side 122 of integration plate 120 may be flush with top surface 124 of deck 20. Each integration plate 120 may be configurable for an array of hardware locations 126 and sizes via fully tapped holes 128. In select embodiments, each of the fully tapped holes 128 may be reinforced with steel threaded inserts. The fully tapped holes 128 may be located and sized to match a thread size and a pitch that a customer chooses for each integration plate 120. Accordingly, each integration plate 120 with fully tapped holes 128 may be configured to mount weaponry, wherein a bolt pattern of the weaponry may be configured to match the fully tapped holes 128 of integration plate 120. As an example, and clearly not limited thereto, configurable common deck system 10 with the integration plate 120 installed on deck 20 may provide a flat and clean surface 146 that a customer can use to carry standard cargo, a palletized item or, palletized items. Whereby, the configurable common deck system 10 with the integration plate 120 may be configured to then switch to mount a particular item that gives the customer offensive or defensive capabilities. As an example, and clearly not limited thereto, in select embodiments integration plate 120 and its fully tapped holes 128 may be configured to mount weaponry. In this example, the bolt pattern of the weaponry may be configured to match the fully tapped holes 128 of the integration plate 120. The main concept of the embodiments of the configurable common deck system 10 with the flush mounted integrated plates 120 may be to provide flush mounted "integration features" that contain customer and/or weapon system specific bolt pattern mounting features with thread size/pitch as dictated again by the customer singularly or by joint effort with MSI Design Engineering of Mooresville, N.C. These "integration features" can occur in multiple locations (not just the 2 center mounted as shown in the Figures w/circular bolt pattern) and can be in customer specific shapes (think square or rectangular features that are located/recessed into any of the 6" wide plank sections, with square or rectangular bolt patterns). As a result, as shown in the Figures, in select embodiments integration plates 120 may be circular integration plates 120C with circularly oriented fully tapped holes 128C. In other select embodiments, as shown in the Figures, integration plates 120 may be rectangular plates 120R with rectangularly oriented fully tapped holes 128R. In other select embodiments, as shown in the Figures, integration plates 120 may include both circular integration plates 120C with circularly oriented fully tapped holes 128C and rectangular integration plates 120R with rectangularly oriented fully tapped holes 128R. As should be understood by one skilled in the art, the integration plates 120, including any combination of circular integration plates 120C and/or rectangular integration plates 120R, or other shaped or sized integration plates 120, may be included at any desired location or combination of locations on deck 20 of configurable common deck system 10. As such, although the Figures show certain configurations for integration plates 120, the disclosure is not so limited, an configurable common deck system 10 may be provided with no integration plates 120, or any various combination of size, shape and location of integration plates 120 as a customer may desire.

In another aspect, the instant disclosure may be directed toward the configurable common deck system 10 in any of the various embodiments and/or combination of embodiments shown and/or described herein.

Figure 31:
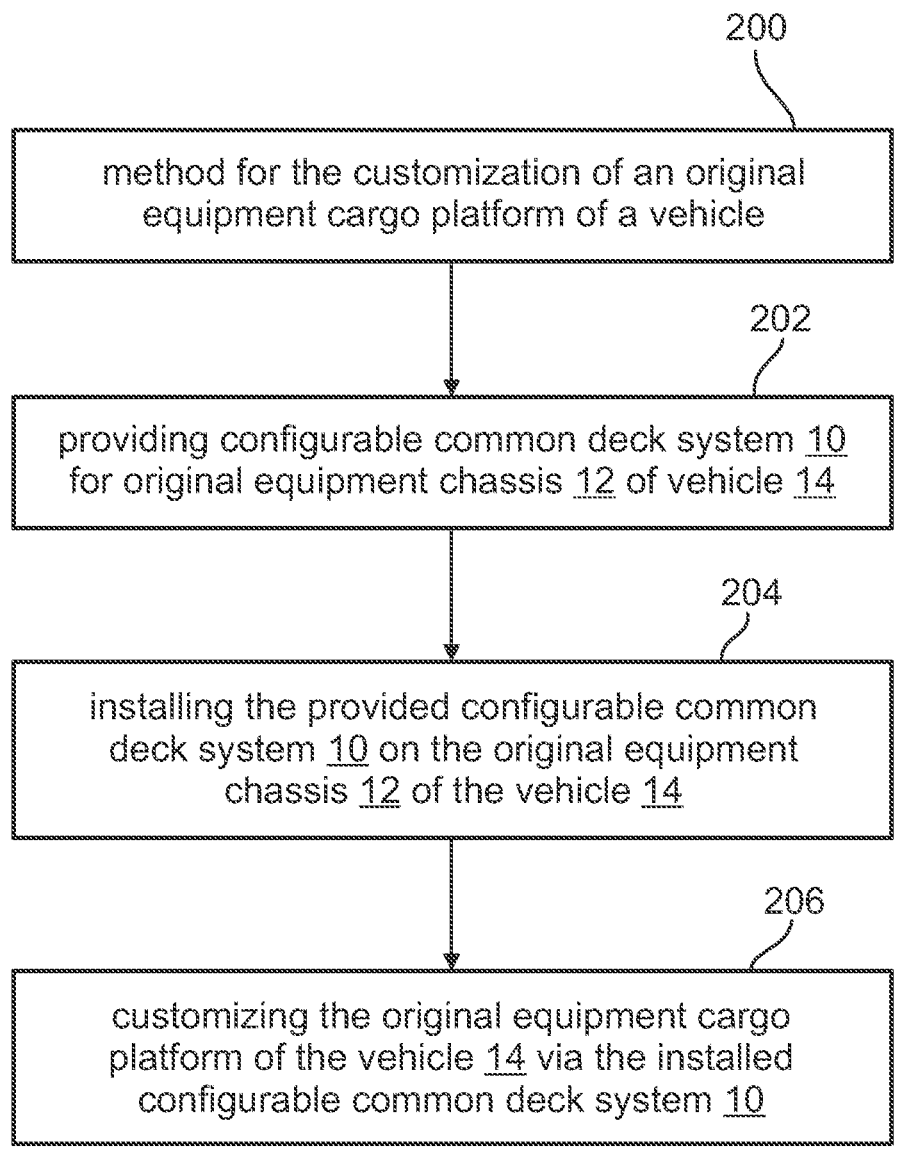
FIG. 31 is a flow chart of the method of the customizing of an original equipment cargo platform of a vehicle according to select embodiments of the instant disclosure.

Referring now to FIG. 31, in another aspect, the instant disclosure embraces method 200 for the customization of an OE cargo platform of a vehicle. Method 200 for the customization of an OE cargo platform of a vehicle may include utilizing configurable common deck system 10 disclosed herein in any of the various embodiments and/or combination of embodiments shown and/or described herein. As such, in general method 200 for the customization of an OE cargo platform of a vehicle may include step 202 of providing configurable common deck system 10 for OE chassis 12 of vehicle 14 as disclosed herein in any of the various embodiments and/or combination of embodiments shown and/or described herein. Accordingly, the provided configurable common deck system 10 may generally include support frame 16 and plurality of decking planks 18. Support frame 16 may be configured to attach to OE chassis 12 of vehicle 14. The plurality of decking planks 18 may be configured to cover support frame 16 to create deck 20. Wherein, deck 20 may have customizable size 22 with length 24, width 26 and height 28. As a result, with the provided configurable common deck system 10, method 200 for the customization of an OE cargo platform of a vehicle may also include the steps of: step 204 of installing the provided configurable common deck system 10 on OE chassis 12 of vehicle 14; and step 206 of customizing the OE cargo platform of vehicle 14 via the installed configurable common deck system 10.

One advantage of the disclosed configurable common deck system 10 may be configured to be combined with an OE tailored lower frame structure. When combined, the disclosed configurable common deck system 10 may provide a complete assembly that can be attached to an OE vehicle chassis. Then, as an example, as the vehicles troop capacity or cargo capacity changes with customers needs, the module extension assembly 106 can be included to cover a larger vehicle base. The module extension assembly 106 may be made the same as a complete main vehicle deck assembly, with an upper common deck assembly and a lower frame structure.

Another feature of the disclosed configurable common deck system 10 may be its ability to be customized in a modular format, per customer specifications, to achieve specific length, width and height dimensions.

Another feature of the disclosed configurable common deck system 10 may be its ability to be configured to work in conjunction with multiple OE occupant compartment (or "cab") configurations (such as single, 2-door, extended, 4-door and crew cab variants) of a given OE manufacturer model/chassis type, while offering interchangeability of the main deck module assembly, between OE vehicle platforms that use a common chassis configuration.

Another feature of the disclosed configurable common deck system 10 may be its ability to provide multiple cargo and/or equipment anchoring solutions, via fully integrated maximized length anchor tracks 30, like Ancra track sections provided by Ancra Cargo of Erlanger, Ky. The dimensional layout of these anchor track 30 sections vastly increases the number of anchor point locations, compared to OE cargo platforms, and allows for customer selectable anchoring hardware types, all of which engage the anchor tracks 30, like via the industry standardized interface profile dimensions of Ancra track sections provided by Ancra Cargo of Erlanger, Ky.

Another feature of the disclosed configurable common deck system 10 may be its ability to directly accept and mount, via the provided lengths of anchor tracks 30, multiple existing and future MSI Defense Solutions, LLC of Mooresville, N.C. designed modules, kits and sub-systems.

Another feature of the disclosed configurable common deck system 10 may be its ability to be reconfigured to achieve customer specified mission profile set(s) by installing and/or removing anchor track 30 mounted modules, kits or sub-systems without having to replace the main deck 20 and extension deck modules 106.

Another feature of the disclosed configurable common deck system 10 may be its ability to be configured to contain customer and/or weapon system specific bolt pattern mounting features with thread size/pitch as dictated by the customer singularly or by joint effort with MSI Design Engineering of Mooresville, N.C.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A configurable common deck system for an original equipment chassis of a vehicle comprising:
   a support frame configured to attach to the original equipment chassis of the vehicle; and
   a plurality of decking planks configured to cover the support frame to create a deck;
   wherein, the deck having a customizable size with a length, a width and a height,
   wherein the support frame includes:
      a pair of longitudinal beams running the length of the deck, the pair of longitudinal beams including attachment locations configured for attaching the deck to the original equipment chassis;
      a plurality of cross-beams interconnecting the pair of the longitudinal beams;
      a plurality of supports configured for supporting the plurality of decking planks and a plurality of anchor tracks; and
      a rigid outer deck frame.

2. The configurable common deck system of claim 1 further comprising a plurality of anchor being recessed between the decking planks or on top of the decking planks, the plurality of anchor tracks being configured for attaching modules, kits and sub-systems at various desired locations on the deck.

3. The configurable common deck system of claim 2, wherein each of the plurality of anchor tracks are seat and cargo track fittings configured for a single stud fitting, a double stud fitting and a triple stud fitting, where each of the plurality of anchor tracks includes:
   a single stud load capacity rating from 4,000 to 6,000 pounds for the single stud fitting; or
   a double or triple stud load capacity rating up to 10,000 pounds for the double stud fitting or the triple stud fitting;
   wherein the plurality of anchor tracks are configured for panel fittings, stanchion fittings, galley fittings, tiedown fittings, or a combination thereof.

4. The configurable common deck system of claim 1 further comprising at least one attachment ring configured for lifting the deck, securing cargo on the deck, or combinations thereof.

5. The configurable common deck system of claim 4 comprising four attachment rings.

6. The configurable common deck system of claim 1, wherein each of the attachment locations on the pair of longitudinal beams including a cantilever mount with a tension bracket having a hook and at least one attachment hole configured for securing the longitudinal beams directly to the original equipment chassis via bolts.

7. The configurable common deck system of claim 1 further comprising a cargo or equipment cover assembly configured for covering the deck in a closed position and being configured to open to a rear of the deck in an open position for exposing the deck.

8. The configurable common deck system of claim 7, wherein the cargo or equipment cover assembly includes a pair of slide tracks approximate outer longitudinal edges of the deck configured to allow the cargo or equipment cover assembly to slide from the closed position to the open position, wherein the pair of the slide tracks approximate the outer longitudinal edges of the deck are attached to the deck via ones of the anchor tracks on or approximate the outer longitudinal edges of the deck.

9. The configurable common deck system of claim 1 further comprising a bulkhead rollbar assembly, wherein the bulkhead rollbar assembly is configured to attach and support equipment, weaponry, or combinations thereof near a cab of the vehicle.

10. The configurable common deck system of claim 1 further comprising a module extension assembly configured to provide an added length to the deck for mounting on a longer original equipment chassis or on a same length original equipment chassis, the module extension assembly creating an extended length of the deck.

11. The configurable common deck system of claim 10, wherein the module extension assembly includes:
   an extension frame configured to attach to the original equipment chassis of the vehicle;
   a plurality of extended decking planks configured to cover the extension frame to create an extension deck; and
   a pair of connection rods configured to connect the support frame of the deck to the extension frame of the extension deck, the pair of the connection rods being configured for locating, connecting and stiffening the connection between the module extension assembly and the deck.

12. The configurable common deck system of claim 1 further includes an integration plate.

13. The configurable common deck system of claim 12, wherein the integration plate is flush mounted to the decking planks and a plurality of the another tracks, wherein a top side of the integration plate is flush with a top surface of the deck.

14. The configurable common deck system of claim 12, wherein the integration plate is configurable for an array of hardware locations and sizes via fully tapped holes, wherein each of the fully tapped holes are reinforced with steel threaded inserts and are located and sized to match a thread size and a pitch that a customer chooses.

15. The configurable common deck system of claim 14, wherein the integration plate is configured to mount weaponry, wherein a bolt pattern of the weaponry is configured to match the fully tapped holes of the integration plate, wherein the integration plate includes:
   a circular integration plate with circularly oriented fully tapped holes;
   a rectangular integration plate with rectangularly oriented fully tapped holes; or
   combinations thereof.

16. The configurable common deck system of claim 12, wherein the integration plate provides a flat and clean surface that a customer can use to carry standard cargo, a palletized item or, palletized items, whereby the configurable common deck system with the integration plate is configured to then switch to mount a particular item that gives the customer offensive or defensive capabilities.

17. A method for the customization of an original equipment cargo platform of a vehicle comprising:
   providing a configurable common deck system for an original equipment chassis of the vehicle comprising:
      a support frame configured to attach to the original equipment chassis of the vehicle; and
      a plurality of decking planks configured to cover the support frame to create a deck;

wherein, the deck having a customizable size with a length, a width and a height;
wherein the support frame includes:
a pair of longitudinal beams running the length of the deck, the pair of longitudinal beams including attachment locations configured for attaching the deck to the original equipment chassis;
a plurality of cross-beams interconnecting the pair of the longitudinal beams;
a plurality of supports configured for supporting the plurality of decking planks and a plurality of anchor tracks; and
a rigid outer deck frame;
installing the provided configurable common deck system on the original equipment chassis of the vehicle; and
customizing the original equipment cargo platform of the vehicle via the installed configurable common deck system.

18. A configurable common deck system for an original equipment chassis of a vehicle comprising:
a support frame configured to attach to the original equipment chassis of the vehicle; and
a plurality of decking planks configured to cover the support frame to create a deck;
a cargo or equipment cover assembly configured for covering the deck in a closed position and being configured to open to a rear of the deck in an open position for exposing the deck, wherein the cargo or equipment cover assembly includes a pair of slide tracks approximate outer longitudinal edges of the deck configured to allow the cargo or equipment cover assembly to slide from the closed position to the open position, wherein the pair of the slide tracks approximate the outer longitudinal edges of the deck are attached to the deck via anchor track on or approximate the outer longitudinal edges of the deck; and
wherein, the deck having a customizable size with a length, a width and a height.

19. A configurable common deck system for an original equipment chassis of a vehicle comprising:
a support frame configured to attach to the original equipment chassis of the vehicle; and
a plurality of decking planks configured to cover the support frame to create a deck;
a module extension assembly configured to provide an added length to the deck for mounting on a longer original equipment chassis or on a same length original equipment chassis, the module extension assembly creating an extended length of the deck, wherein the module extension assembly includes:
an extension frame configured to attach to the original equipment chassis of the vehicle;
a plurality of extended decking planks configured to cover the extension frame to create an extension deck; and
a pair of connection rods configured to connect the support frame of the deck to the extension frame of the extension deck, the pair of the connection rods being configured for locating, connecting and stiffening the connection between the module extension assembly and the deck; and
wherein, the deck having a customizable size with a length, a width and a height.

20. A configurable common deck system for an original equipment chassis of a vehicle comprising:
a support frame configured to attach to the original equipment chassis of the vehicle; and
a plurality of decking planks configured to cover the support frame to create a deck;
an integration plate, the integration plate is configurable for an array of hardware locations and sizes via fully tapped holes, wherein each of the fully tapped holes are reinforced with steel threaded inserts and are located and sized to match a thread size and a pitch that a customer chooses, wherein the integration plate is configured to mount weaponry, wherein a bolt pattern of the weaponry is configured to match the fully tapped holes of the integration plate, wherein the integration plate includes:
a circular integration plate with circularly oriented fully tapped holes;
a rectangular integration plate with rectangularly oriented fully tapped holes; or
combinations thereof; and
wherein, the deck having a customizable size with a length, a width and a height.

* * * * *